US008117561B2

(12) United States Patent
Hozumi

(10) Patent No.: US 8,117,561 B2
(45) Date of Patent: Feb. 14, 2012

(54) METHOD AND SYSTEM FOR MANAGING APPARATUS

(75) Inventor: Hiroshi Hozumi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 819 days.

(21) Appl. No.: 11/882,710

(22) Filed: Aug. 3, 2007

(65) Prior Publication Data

US 2008/0036779 A1 Feb. 14, 2008

(30) Foreign Application Priority Data

Aug. 4, 2006 (JP) ................................ 2006-213229
Jul. 9, 2007 (JP) ................................ 2007-179511

(51) Int. Cl.
*G06F 3/033* (2006.01)

(52) U.S. Cl. ...................................................... 715/825

(58) Field of Classification Search .................. 715/825, 715/810, 841
See application file for complete search history.

(56) References Cited

U.S. PATENT DOCUMENTS 6,021,284 A * 2/2000 Serizawa et al. .................. 399/8
6,101,478 A * 8/2000 Brown .............................. 705/2
6,937,370 B1 * 8/2005 Nitta et al. .................... 358/518
6,950,869 B2 * 9/2005 Iizuka ............................ 709/224
7,101,014 B2 * 9/2006 Johnson et al. ................. 347/19
7,586,633 B2 * 9/2009 Urabe .......................... 358/1.15
2007/0285689 A1 12/2007 Hozumi

FOREIGN PATENT DOCUMENTS

JP 2003-323093 11/2003
JP 2003-323283 11/2003
JP 2004-135323 4/2004

OTHER PUBLICATIONS

U.S. Appl. No. 11/688,674, filed Mar. 20, 2007.

* cited by examiner

*Primary Examiner* — William Bashore
*Assistant Examiner* — Meseker Takele
(74) *Attorney, Agent, or Firm* — Harness, Dickey & Pierce, P.L.C.

(57) ABSTRACT

A storage unit is configured to store screen element data on screen elements included in an operation screen of each apparatus. A receiving unit is configured to receive screen design data on the screen elements that forms the operation screen and setting data on settings for each apparatus. A screen drawing unit is configured to draw the operation screen by obtaining required screen elements from the screen element data based on the screen design data and the setting data. The receiving unit accumulates log data received from the apparatus. The screen drawing unit updates the screen design of the operation screen based on the log data and the screen element data.

17 Claims, 31 Drawing Sheets

| | | |
|---|---|---|
| FIG. 3A | FIG. 3B | FIG. 3C |
| FIG. 3D | FIG. 3E | FIG. 3F |

| NAME OF SCREEN | SCREEN ELEMENTS | SIZE (H × W) | POSITION (H, W) | TYPE | DESCRIPTION (API OPERATION) |
|---|---|---|---|---|---|
| HARD KEY | | | | | |
| | START KEY (DESIGN A) | | | KEY | START |
| | NUMERIC KEYS (DESIGN A) | | | KEY | NUMERIC INPUT |
| | STOP KEY (DESIGN A) | | | KEY | STOP |
| | CLEAR/STOP KEY (DESIGN A) | | | KEY | CLEAR/STOP |
| TOP SCREEN | | | | | |
| | COPIER (DESIGN A) | 10 × 10 | 5, 5 | KEY | SWITCH TO COPIER SCREEN |
| | PRINTER (DESIGN A) | 10 × 10 | 5, 20 | KEY | SWITCH TO PRINTER SCREEN |
| | FACSIMILE (DESIGN A) | 10 × 10 | 20, 5 | KEY | SWITCH TO FACSIMILE SCREEN |

FIG. 3B

| | SCANNER (DESIGN A) | 10×10 | 20, 20 | KEY | SWITCH TO SCANNER SCREEN |
|---|---|---|---|---|---|
| COPIER SCREEN | | | | | |
| | SELECT PAPER-SIZE (DESIGN A) | 3×10 | 5, 5 | LIST | SET PAPER SIZE |
| | AUTO SETTING | – | – | LIST ITEM | – |
| | SELECT A4-SIZE PAPER | – | – | LIST ITEM | – |
| | SELECT A3-SIZE PAPER | – | – | LIST ITEM | – |
| | SELECT B5-SIZE PAPER | – | – | LIST ITEM | – |
| | SELECT EDIT TYPE (DESIGN A) | 3×10 | 10, 5 | LIST | SELECT EDIT TYPE |
| | NO SPECIFICATION | – | – | LIST ITEM | – |
| | COMBINE | – | – | LIST ITEM | – |
| | DUPLEX | – | – | LIST TEAM | – |

FIG. 3C

| | | | | | |
|---|---|---|---|---|---|
| | DUPLEX/COMBINE | - | - | LIST ITEM | - |
| | 4-IN-1 | - | - | LIST ITEM | - |
| | DUPLEX/4-IN-1 | - | - | LIST ITEM | - |
| | SELECT REDUCTION RATIO | - | - | LIST ITEM | - |
| | SELECT ZOOM RATIO (DESIGN A) | 3×10 | 15, 5 | LIST | SELECT ZOOM RATIO |
| | ORIGINAL SIZE | - | - | LIST ITEM | - |
| | A4→A3 | - | - | LIST TEAM | - |
| | A4→B5 | - | - | LIST ITEM | - |
| | A3→A4 | - | - | LIST ITEM | - |
| | B5→A4 | - | - | LIST ITEM | - |
| | SELECTED ZOOM RATIO | - | - | LIST ITEM | - |

FIG. 3D

| | | | | | |
|---|---|---|---|---|---|
| | COPY QUANTITY DISPLAY (DESIGN A) | 3×10 | 5, 20 | INPUT DISPLAY FIELD | DISPLAY INPUT COPY QUANTITY |
| | SELECT PRINT DENSITY (DESIGN A) | 3×10 | 10, 20 | LIST | SELECT PRINT DENSITY |
| | DARK LEVEL 2 | – | – | LIST ITEM | – |
| | DARK LEVEL 1 | – | – | LIST ITEM | – |
| | NORMAL | – | – | LIST ITEM | – |
| | LIGHT LEVEL 1 | – | – | LIST ITEM | – |
| | LIGHT LEVEL 2 | – | – | LIST ITEM | – |
| | SELECT FINISHING TYPE (DESIGN A) | 3×10 | 15, 20 | LIST | SELECT FINISHING TYPE |
| | NO SPECIFICATION | – | – | LIST ITEM | – |
| | SORT | – | – | LIST ITEM | – |
| | STAPLE TOP RIGHT CORNER | – | – | LIST ITEM | – |

FIG. 3E

| | | | | | |
|---|---|---|---|---|---|
| | STAPLE TOP LEFT CORNER | – | – | LIST ITEM | – |
| | STAPLE TWO TOP PORTIONS | – | – | LIST ITEM | – |
| | STAPLE TWO SIDE PORTIONS | – | – | LIST ITEM | – |
| | · | | | | |
| | · | | | | |
| PRINTER SCREEN | · | | | | |
| | · | | | | |
| | · | | | | |
| | · | | | | |
| FACSIMILE SCREEN | · | | | | |
| | · | | | | |

FIG. 3F

| | | | | | |
|---|---|---|---|---|---|
| | · | | | | |
| | · | | | | |
| SCANNER SCREEN | · | | | | |
| | · | | | | |
| | · | | | | |
| | · | | | | |
| · | · | | | | |
| · | · | | | | |
| · | · | | | | |
| · | · | | | | |

| | | |
|---|---|---|
| FIG. 6A | FIG. 6B | FIG. 6C |
| FIG. 6D | FIG. 6E | |

| NAME OF SCREEN | SCREEN ELEMENTS | SIZE (H×W) | POSITION (H, W) | TYPE | DESCRIPTION (API OPERATION) |
|---|---|---|---|---|---|
| HARD KEY | | | | | |
| | START KEY (DESIGN A) | | 5, 5 | KEY | START |
| | NUMERIC KEYS (DESIGN A) | | | KEY | NUMERIC INPUT |
| | STOP KEY (DESIGN A) | | | KEY | STOP |
| | CLEAR/STOP KEY (DESIGN A) | | | KEY | CLEAR/STOP |
| TOP SCREEN | | | | | |
| | COPIER (DESIGN A) | 10×10 | 5, 5 | KEY | SWITCH TO COPIER SCREEN |
| | PRINTER (DESIGN A) | 10×10 | 5, 20 | KEY | SWITCH TO PRINTER SCREEN |
| | FACSIMILE (DESIGN A) | 10×10 | 20, 5 | KEY | SWITCH TO FACSIMILE SCREEN |

FIG. 6B

| | SCANNER (DESIGN A) | 10×10 | 20, 20 | KEY | SWITCH TO SCANNER SCREEN |
|---|---|---|---|---|---|
| COPIER SCREEN | | | | | |
| | SELECT PAPER-SIZE (DESIGN A) | 10×10 | 5, 5 | KEY SELECT BOX | SET PAPER SIZE |
| | AUTO SETTING | - | - | SELECT KEY | - |
| | SELECT A4-SIZE PAPER | - | - | SELECT KEY | - |
| | SELECT A3-SIZE PAPER | - | - | SELECT KEY | - |
| | SELECT B5-SIZE PAPER | - | - | SELECT KEY | - |
| | SELECT EDIT TYPE (DESIGN B) | 15×10 | 15, 15 | KEY SELECT BOX | SELECT ZOOM RATIO |
| | NO SPECIFICATION | - | - | SELECT KEY | - |
| | A4→A3 | - | - | SELECT KEY | - |

FIG. 6C

| | | | | | |
|---|---|---|---|---|---|
| | A4→B5 | – | – | SELECT KEY | – |
| | A3→A4 | – | – | SELECT KEY | – |
| | B5→A4 | – | – | SELECT KEY | – |
| | SELECTED ZOOM RATIO | – | – | SELECT KEY | – |
| | COPY QUANTITY DISPLAY (DESIGN A) | 3×10 | 5, 20 | INPUT DISPLAY FIELD | DISPLAY INPUT COPY QUANTITY |
| | SELECT FINISHING TYPE (DESIGN A) | 15×10 | 15, 20 | KEY SELECT BOX | SELECT FINISHING TYPE |
| | NO SPECIFICATION | – | – | SELECT KEY | – |
| | SORT | – | – | SELECT KEY | – |
| | STAPLE TOP RIGHT CORNER | – | – | SELECT KEY | – |
| | STAPLE TOP LEFT CORNER | – | – | SELECT KEY | – |

FIG. 6D

| | | | | | |
|---|---|---|---|---|---|
| | STAPLE TWO TOP PORTIONS | – | – | SELECT KEY | – |
| | STAPLE TWO SIDE PORTIONS | – | – | SELECT KEY | – |
| | OTHER KEY (DESIGN A) | 3×10 | 20, 20 | KEY | SWITCH TO OTHER SCREEN |
| | · | | | | |
| PRINTER SCREEN | · | | | | |
| | · | | | | |
| | · | | | | |
| | · | | | | |
| FACSIMILE SCREEN | · | | | | |
| | · | | | | |

| | |
|---|---|
| FIG. 14A | FIG. 14B |
| FIG. 14C | FIG. 14D |

| NAME OF SCREEN | SCREEN ELEMENTS | NUMBER OF OPERATIONS |
|---|---|---|
| HARD KEY | | |
| | START KEY (DESIGN A) | 3500 |
| | NUMERIC KEYS (DESIGN A) | 6000 |
| | STOP KEY (DESIGN A) | 200 |
| | CLEAR/STOP KEY (DESIGN A) | 300 |
| TOP SCREEN | | |
| | COPIER (DESIGN A) | 3000 |
| | PRINTER (DESIGN A) | 200 |
| | FACSIMILE (DESIGN A) | 2000 |
| | SCANNER (DESIGN A) | 500 |
| COPIER SCREEN | | |
| | SELECT PAPER-SIZE (DESIGN A) | 1000 |
| | AUTO SETTING | 800 |
| | SELECT A4-SIZE PAPER | 150 |

FIG. 14B

| | | |
|---|---|---|
| | SELECT A3-SIZE PAPER | 30 |
| | SELECT B5-SIZE PAPER | 20 |
| | SELECT EDIT TYPE (DESIGN A) | 100 |
| | NO SPECIFICATION | 80 |
| | COMBINE | 5 |
| | DUPLEX | 15 |
| | DUPLEX/COMBINE | 0 |
| | 4-IN-1 | 0 |
| | DUPLEX/4-IN-1 | 0 |
| | SELECT REDUCTION RATIO | 0 |
| | SELECT ZOOM RATIO (DESIGN A) | 1000 |
| | ORIGINAL SIZE | 900 |
| | A4→A3 | 60 |
| | A4→B5 | 0 |
| | A3→A4 | 40 |
| | B5→A4 | 0 |

FIG. 14C

| | | |
|---|---|---|
| | SELECTED ZOOM RATIO | 0 |
| | COPY QUANTITY DISPLAY (DESIGN A) | 2500 |
| | SELECT PRINT DENSITY (DESIGN A) | 0 |
| | DARK LEVEL 2 | 0 |
| | DARK LEVEL 1 | 0 |
| | NORMAL | 0 |
| | LIGHT LEVEL 1 | 0 |
| | LIGHT LEVEL 2 | 0 |
| | SELECT FINISHING TYPE (DESIGN A) | 500 |
| | NO SPECIFICATION | 50 |
| | SORT | 300 |
| | STAPLE TOP RIGHT CORNER | 10 |
| | STAPLE TOP LEFT CORNER | 140 |
| | STAPLE TWO TOP PORTIONS | 0 |
| | STAPLE TWO SIDE PORTIONS | 0 |
| | | |

FIG. 14D

| | | |
|---|---|---|
| | · | |
| PRINTER SCREEN | · | |
| | · | |
| | · | |
| | · | |
| FACSIMILE SCREEN | · | |
| | · | |
| | · | |
| | · | |
| SCANNER SCREEN | · | |
| | · | |
| | · | |
| | · | |
| · | · | |
| · | · | |
| · | · | |

METHOD AND SYSTEM FOR MANAGING APPARATUS

CROSS-REFERENCE TO RELATED APPLICATIONS

The present application claims priority to and incorporates by reference the entire contents of Japanese priority documents, 2006-213229 filed in Japan on Aug. 4, 2006 and 2007-179511 filed in Japan on Jul. 9, 2007.

BACKGROUND OF THE INVENTION

1. Field of the Invention

The present invention relates to a technology for managing an apparatus that performs a process in response to an operation on an operation screen.

2. Description of the Related Art

An operation panel is generally included in an apparatus, such as a facsimile, a printer, a copier, a scanner, and a multifunction product, so that a user can input an operation input to the apparatus via the operation panel. A screen design (screen layout) of the operation panel is different by each apparatus, and cannot be changed easily. For example, when the screen layout of the operation panel is to be changed, an entire module that manages the operation panel needs to be replaced with a new one.

In a conventional image processing apparatus, for example, as disclosed in Japanese Patent Application Laid-open No. 2003-323093 or Japanese Patent Application Laid-open No. 2003-323283, the apparatus is managed based on user information such as a usage state of a user, and the user information is also managed by various methods.

However, in the conventional image processing apparatus, the screen design of the operation panel needs to be improved to be more user-friendly.

Namely, even though the apparatus includes a variety of functions, a user does not use all the functions in practical cases. However, all the functions are generally displayed on the operation panel because a required function differs among users. Therefore, even if some of the functions are not necessary to a user, all the functions are displayed on the operation panel, so that the user may select an unneeded function by mistake. Thus, the operation panel of the conventional apparatus is far from user-friendly.

For example, when a user calls a call center to inquire about an operation input for the apparatus, an operator of the call center may fail to communicate with the user because the operation panel is complicated due to a wide variety of the functions, so that it is difficult to explain the operation input over the phone. Therefore, the operation panel of the conventional apparatus needs to be improved in more user-friendly manner.

SUMMARY OF THE INVENTION

It is an object of the present invention to at least partially solve the problems in the conventional technology.

An apparatus management system according to one aspect of the present invention includes an apparatus configured to perform a process in response to an operation on an operation screen; and a management device that is connected to the apparatus via a network, and configured to manage the apparatus. The apparatus includes a first displaying unit configured to display the operation screen and configured to receive an input from the operation screen, a first storage unit configured to store therein screen element data on screen elements that configure the operation screen, screen design data on the screen element data that configures the operation screen, setting data on settings for the apparatus, and log data on a log of an operation performed by a user on the operation screen, a first screen drawing unit configured to create the operation screen based on the screen element data and the screen design data, and configured to draw a created operation screen on the first displaying unit, and a first transmitting unit configured to transmit the screen design data and the setting data to the management device. The management device includes a second displaying unit configured to display thereon the operation screen, a second storage unit configured to store therein the screen element data that configures the operation screen for a plurality of apparatuses, a second receiving unit configured to receive the screen design data and the setting data from the apparatus, and a second screen drawing unit configured to create the operation screen from the screen element data based on the screen design data and the setting data received by the second receiving unit, and configured to draw a created operation screen on the second displaying unit. The first transmitting unit further transmits, when there is an operation input by the user on the operation screen, the log data in which the operation input is recorded to the management device. The second receiving unit further receives the log data from the apparatus. The second screen drawing unit updates the operation screen displayed on the second displaying unit based on received log data and the screen element data stored in the second storage unit, and draws an updated operation screen on the second displaying unit.

A method according to another aspect of the present invention is for managing an apparatus in an apparatus management system that includes an apparatus configured to perform a process in response to an operation on an operation screen and a management device that is connected to the apparatus via a network and manages the apparatus. The method includes storing including the management device storing screen element data that configures the operation screen for a plurality of apparatuses; receiving screen design data on the screen element data that configures the operation screen and setting data on settings for the apparatus; and drawing including creating the operation screen from the screen element data based on the screen design data and the setting data received at the receiving, and drawing created operating screen on a displaying unit. The receiving includes receiving log data on a log of an operation performed by a user on the operation screen from the apparatus. The drawing includes updating the operation screen based on the log data received at the receiving and the screen element data stored at the storing.

An apparatus management system according to still another aspect of the present invention includes an apparatus configured to perform a process in response to an operation on an operation screen; and a management device that is connected to the apparatus via a network, and configured to manage the apparatus. The apparatus includes a first displaying means for displaying the operation screen and receiving an input from the operation screen, a first storing means for storing therein screen element data on screen elements that configure the operation screen, screen design data on the screen element data that configures the operation screen, setting data on settings for the apparatus, and log data on a log of an operation performed by a user on the operation screen, a first screen drawing means for creating the operation screen based on the screen element data and the screen design data, and drawing a created operation screen on the first displaying means, and a first transmitting means for transmitting the screen design data and the setting data to the management device. The management device includes a second displaying means for displaying thereon the operation screen, a second storing means for storing therein the screen element data that configures the operation screen for a plurality of apparatuses, a second receiving means for receiving the screen design data and the setting data from the apparatus, and a second screen drawing means for creating the operation screen from the screen element data based on the screen design data and the setting data received by the second receiving means, and drawing a created operation screen on the second displaying means. The first transmitting means includes a transmitting means for transmitting, when there is an operation input by the user on the operation screen, the log data in which the operation input is recorded to the management device. The second receiving means includes a receiving means for receiving the log data from the apparatus. The second screen drawing means includes an updating means for updating the operation screen displayed on the second displaying means based on received log data and the screen element data stored in the second storing means, and draws an updated operation screen on the second displaying means.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of an example of data on a screen design of an operation screen included in an operation panel of the apparatus shown in FIG. 2;

FIG. 14 is a table of an example of an operation log data; and

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
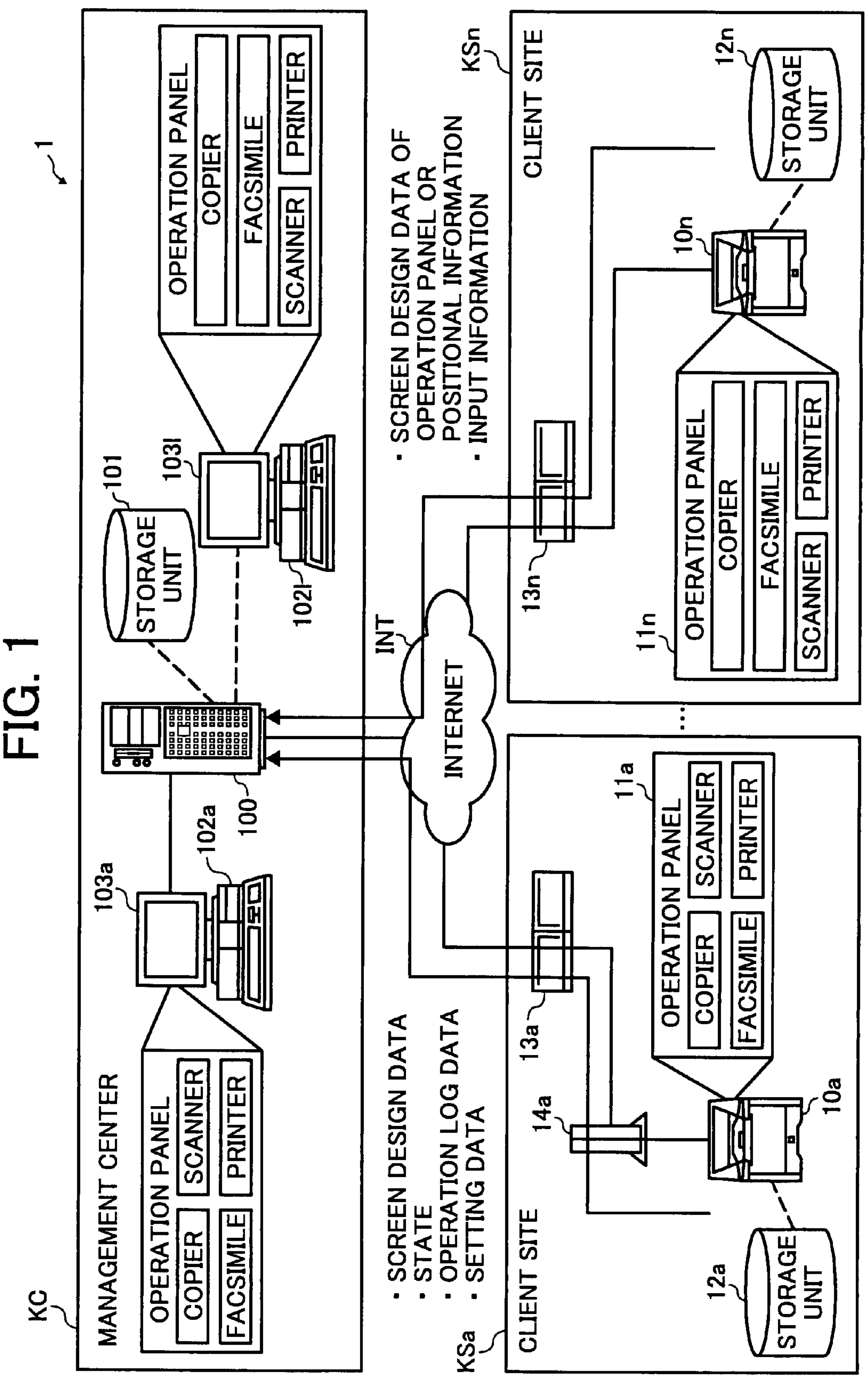
FIG. 1 is a system block diagram of an apparatus management system according to a first embodiment of the present invention.

FIG. 1 is a system block diagram of an apparatus management system 1 according to a first embodiment of the present invention. The apparatus management system 1 includes a management center KC and a plurality of client sites KS (KSa to KSn).

Each of the client sites KS (KSa to KSn) includes an apparatus 10 (10*a* to 10*n*) and a firewall 13 (13*a* to 13*n*). The apparatus 10 is, for example, a printer, a copier, a facsimile, a scanner, or a multifunction product (MFP). Some of the client sites KS further include an interface device (a communication device) 14 (14*a* to 14*m*). In the example shown in FIG. 1, the client site KSa further includes the interface device (the communication device) 14*a*.

The apparatus 10 (10*a* to 10*n*) is connected to a management server 100 included in the management center KC via the firewall 13 (13*a* to 13*n*) and the Internet, or via the interface device 14 (14*a* to 14*m*), the firewall 13 (13*a* to 13*n*), and the Internet. The apparatus 10 (10*a* to 10*n*) is further connected to a network such as a local area network (LAN). The apparatus 10 (10*a* to 10*n*) includes an operation panel 11 (11*a* to 11*n*) with an operation screen 11G (11Ga to 11Gn) (see FIG. 4) and a storage unit 12 (12*a* to 12*n*). Each function included in the apparatus 10 is realized by operating the operation panel 11.

The management center KC includes the management server 100 and a plurality of operator terminals 102 (102*a* to 102I). The management server 100 includes a storage unit 101. Each of the operator terminals 102 (102*a* to 102I) is connected to the management server 100 via a network such as a LAN, and includes an operation panel 103 (103*a* to 103I) with a liquid-crystal-display operation screen and an input unit such as a keyboard or a mouse.

The interface device 14 (14*a* to 14*m*) receives or acquires information on a screen design of the operation screen of the operation panel 11 (11*a* to 11*m*) from the apparatuses 10 (10*a* to 10*m*), and transmits the received/acquired information to the management server 100 via the firewall 13 (13*a* to 13*m*) and the Internet.

The firewall 13 (13*a* to 13*n*) protects the client site KS (KSa to KSn) from being illegally accessed by an external source via the Internet.

Figure 2:
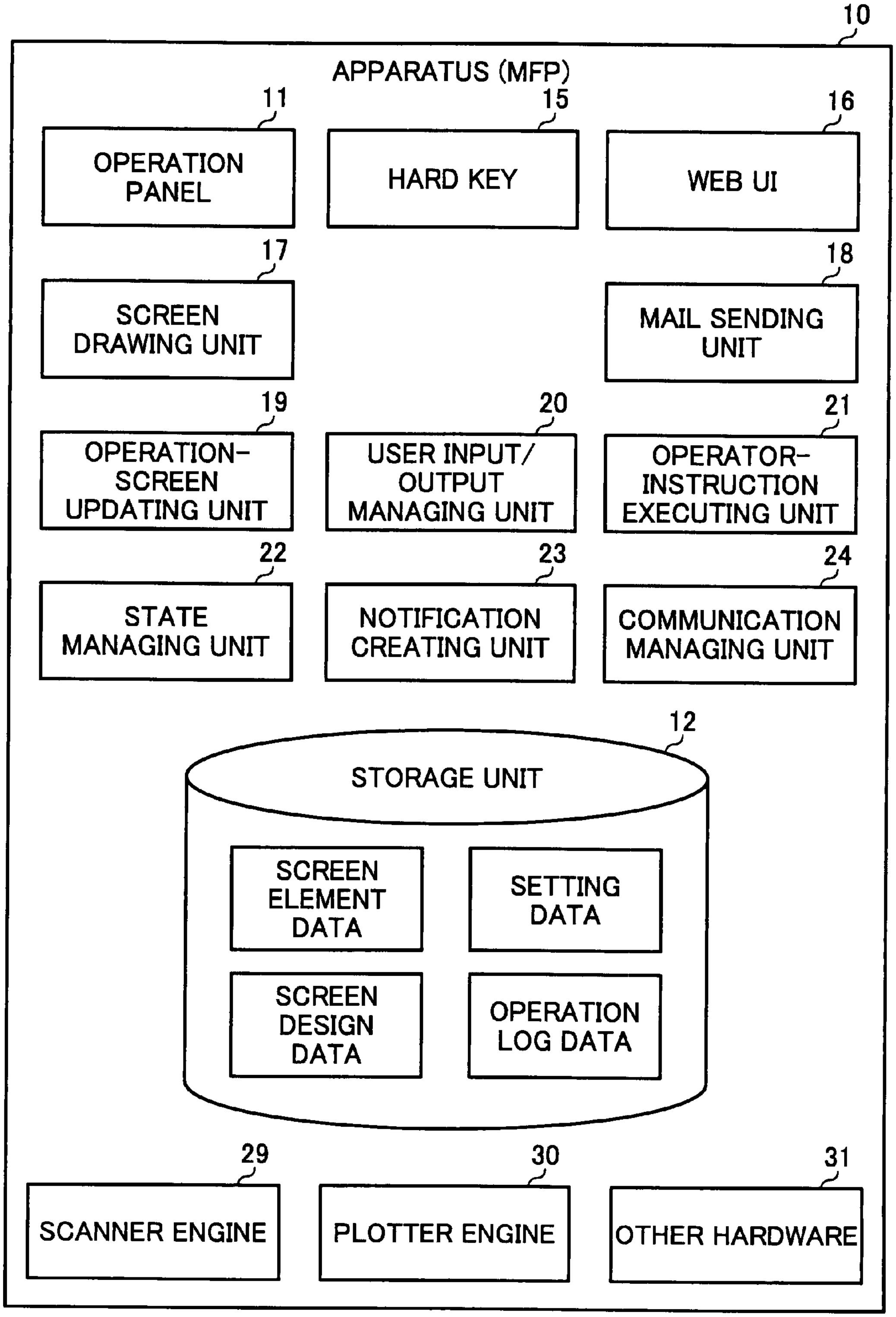
FIG. 2 is a block diagram of an apparatus included in the apparatus management system shown in FIG. 1.

FIG. 2 is a block diagram of the apparatus 10. The apparatus 10 includes the operation panel 11, a hard key 15, a World Wide Web user interface (Web UI) 16, a screen drawing unit 17, a mail sending unit 18, an operation-screen updating unit 19, a user input/output managing unit 20, an operator-instruction executing unit 21, a state managing unit 22, a notification creating unit 23, a communication managing unit 24, the storage unit 12, a scanner engine 29, a plotter (engine 30, and other hardware 31.

The storage unit 12 is a storage medium such as a hard disk drive (HDD), and stores therein screen element data, screen design data, setting data, and operation log data. The screen element data is data on screen elements of the operation screen of the operation panel 11 or an operation screen of the Web UI 16. The screen design data is data on a screen design of the operation screen of the operation panel 11 or the operation screen of the Web UI 16, and specifically on a hierarchic structure of the operation screen and the screen elements used in each operation screen. The screen design data is stored in an extensible markup language (XML) format or an extensible stylesheet language (XSL) format (see FIG. 3). The setting data is data on settings for the apparatus 10, such as a model and an identification number of the apparatus 10, a default setting of the operation screen, and a setting whether an operator of the management center KC is allowed to operate the operation screen. The operation log data is data on an operation log of last twenty operations, i.e., an input log of last twenty inputs to the user input/output managing unit 20 by a user (including the operator).

Figure 4:
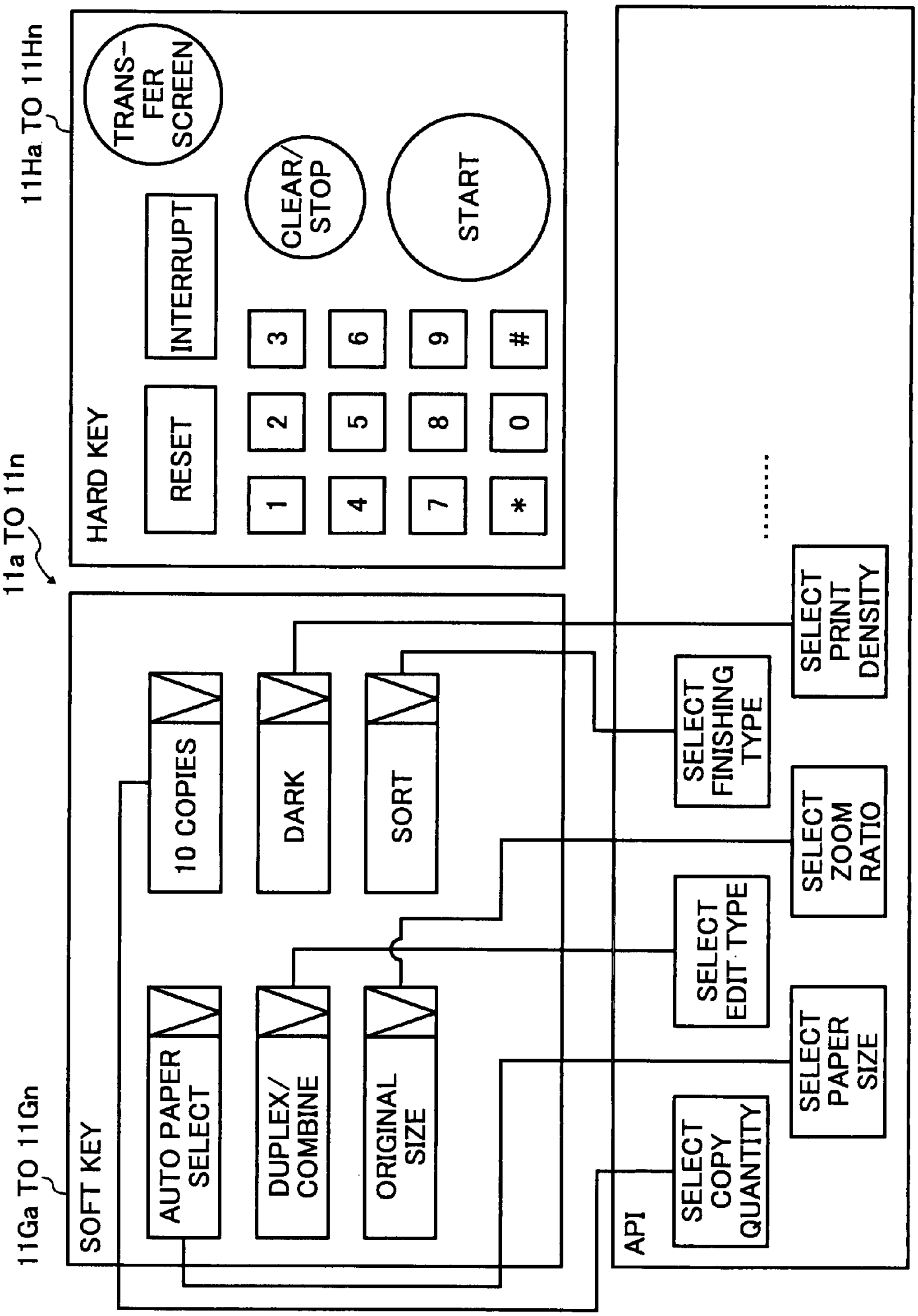
FIG. 4 is a schematic diagram of an example of the operation panel of the apparatus shown in FIG. 2.

As shown in FIG. 4, the operation panel 11 (11*a* to 11*n*) includes the operation screen 11G (11Ga to 11Gn) as a soft key and a hard key 11H (11Ha to 11Hn) such as numeric keys, a "START" key, a "CLEAR/STOP" key, a "RESET" key, an "INTERRUPT" key, and a "SCREEN TRANSFER" key. The operation screen 11G displays thereon a list of operations performed by the apparatus 10, i.e., serves as an input/output interface for outputting the list of the operations to the user and receiving an operation input from the user.

The screen drawing unit 17 draws a screen design of the operation screen 11G on the operation panel 11 or the Web UI 16 based on screen element data and screen design data upon receiving an input from the user input/output managing unit 20 or the operation-screen updating unit 19.

The user input/output managing unit 20 outputs a content of an input onto the operation panel 11, the Web UI 16, or the operator-instruction executing unit 21 to either the screen drawing unit 17 or the state managing unit 22 depending on the input content, and also stores the input content in the storage unit 12 as setting data or operation log data.

The operator-instruction executing unit 21 executes inputting an instruction from the operator to the user input/output managing unit 20 or instructing the mail sending unit 18 to send a mail based on an instruction received from the management server 100.

The notification creating unit 23 creates a notification to be notified to the management server 100, such as a notification of an instruction from the user, a user's input log, an inquiry of the management server 100, or a result of an operation performed by an operator.

The communication managing unit 24 transmits the notification created by the notification creating unit 23 to the management server 100, downloads screen element data or other information from the management server 100, and receives an instruction from the management server 100.

The Web UI 16 is a user interface used for the user to remotely access the apparatus 10 via a user's personal computer (PC).

The hard key 15 is a user interface, which is included in the apparatus 10 as hardware.

The state managing unit 22 manages an operational state of the apparatus 10 through the scanner engine 29, the plotter engine 30, and the other hardware 31, and inputs/outputs data on the state to the user via the user input/output managing unit 20.

The mail sending unit 18 sends a mail in accordance with an instruction from the user input/output managing unit 20 or the operator-instruction executing unit 21.

The operation-screen updating unit 19 updates the displayed operation screen 11G of the operation panel 11 if there is any change in a display design of the operation screen 11G.

The apparatus 10 can customize a screen design of the operation screen 11G based on screen design data and screen element data. The user operates the operation panel 11 to use a function included in the apparatuses 10.

For example, the apparatus 10 includes an application program interface (API) capable of realizing specifications for functions included in the apparatuses 10, such as a copy quantity specification, a paper-size specification, an edit specification, a zoom-ratio specification, a finishing specification, and a print-density specification as shown in FIG. 4. With a key operation of a soft key displayed on the operation screen 11G, a specification function corresponding to the soft key is invoked via the API, and performed by the apparatus 10.

In a case shown in FIG. 4, the operation screen 11G displays thereon "AUTO PAPER SELECT", "DUPLEX/COMBINE", "FULL SIZE", "10 COPIES", "DARK", and "SORT" as selected specifications. At this time, screen design data shown in FIG. 3 is stored in the storage unit 12. As shown in FIG. 3, the screen design data includes a name of a screen, screen elements included in a screen, a size of paper, positional information, a type of a key, and a type of an action (associated with screen elements and the API).

The apparatus 10 automatically creates a screen design of the operation screen 11G based on screen design data including screen element data, API information, and input information.

Figure 5:
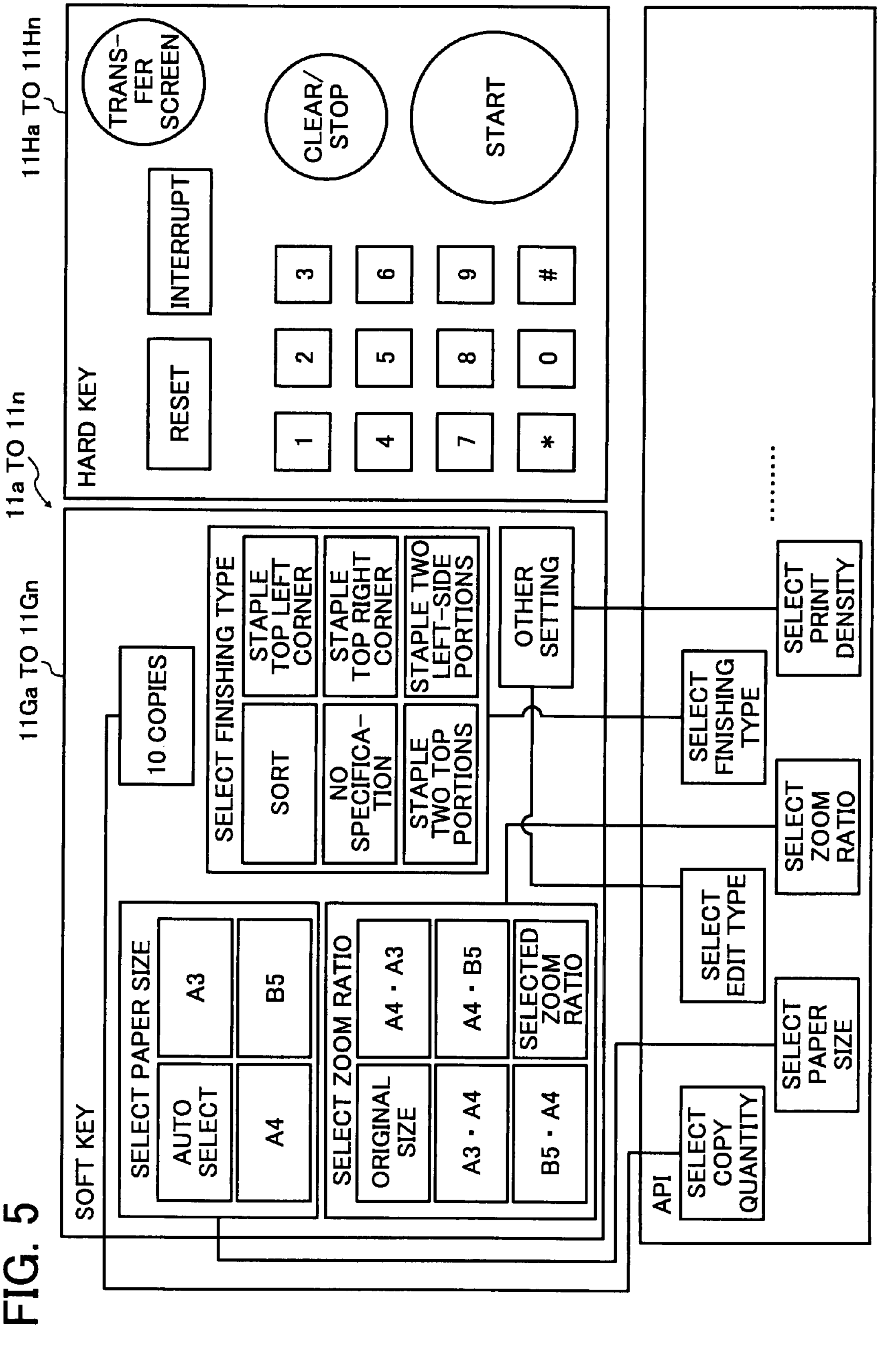
FIG. 5 is a schematic diagram of another example of the operation panel shown in FIG. 4.
Figure 6E:
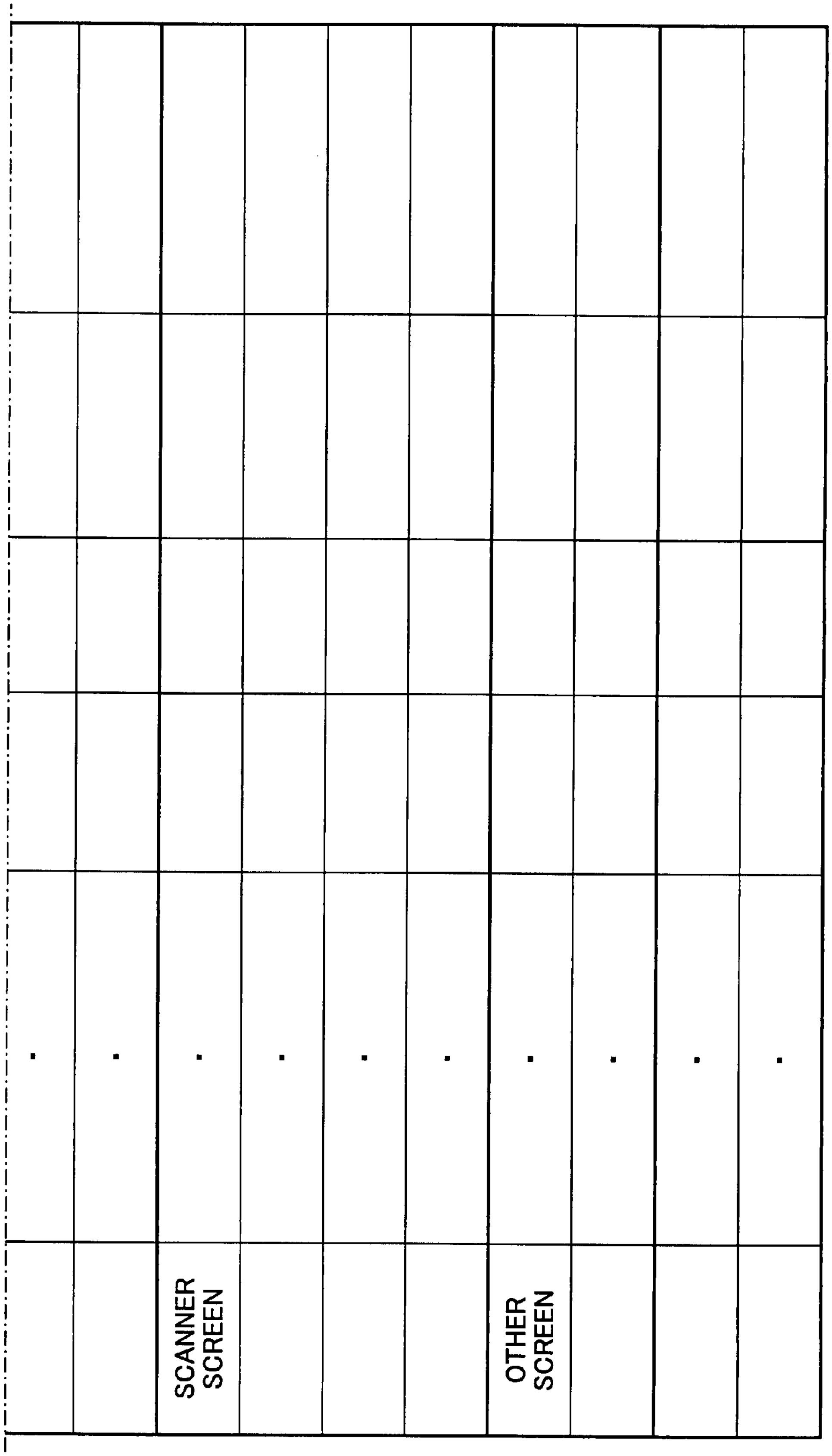
FIG. 6 is a table of an example of data on a screen design of an operation screen included in the operation panel shown in FIG. 5.

With a change of screen elements, the operation screen 11G shown in FIG. 4 is changed to, for example, that is shown in FIG. 5. In the case of the operation screen 11G shown in FIG. 5, screen design data shown in FIG. 6 is stored in the storage unit 12.

The apparatus 10 transmits information on a screen design of the operation screen 11G and information on the apparatus 10 itself, and particularly information relating to the apparatus 10, such as operation log data, to the management server 100 via the firewall 13 and the Internet, or via the interface device 14, the firewall 13, and the Internet.

Figure 7:
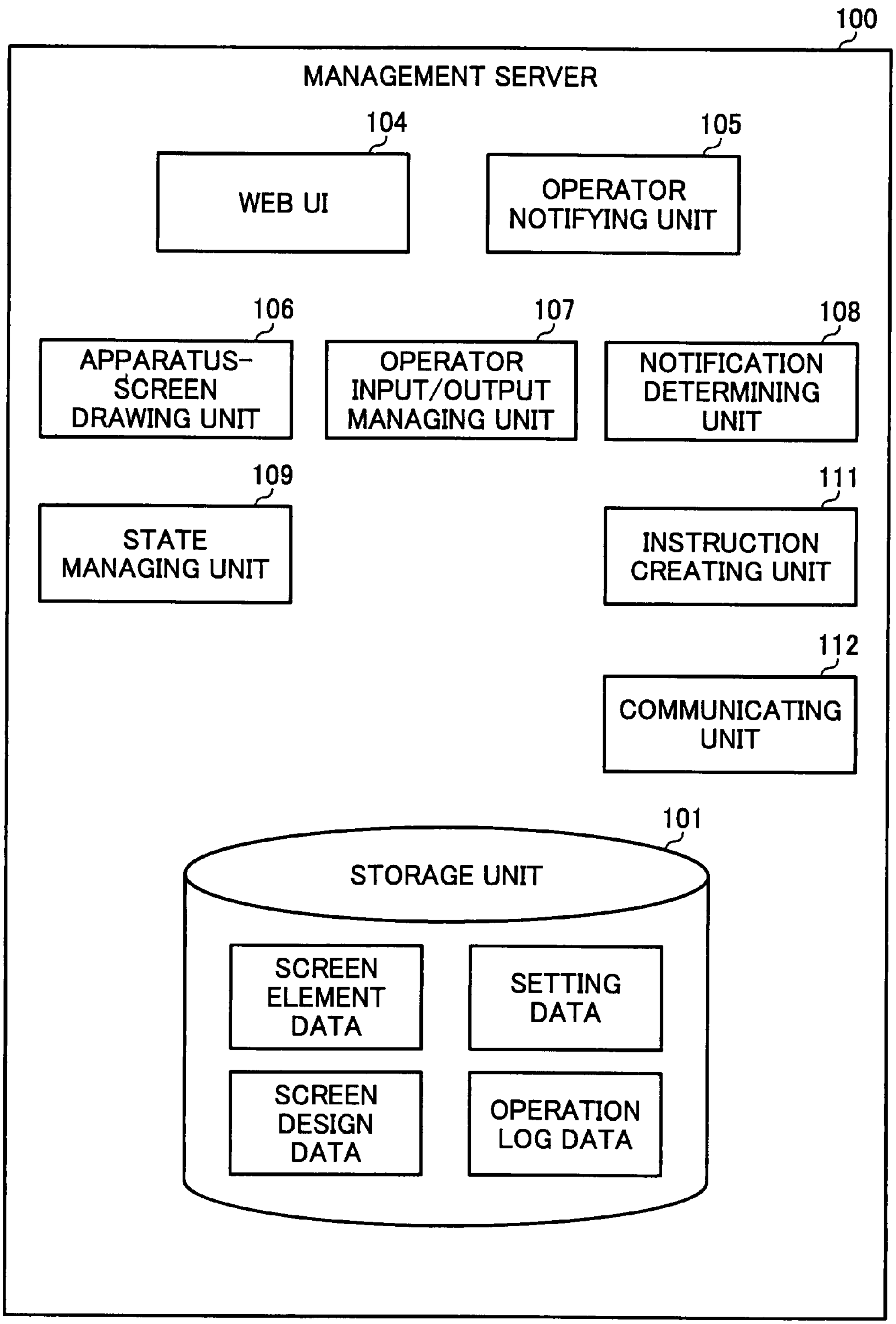
FIG. 7 is a block diagram of a management server included in the apparatus management system shown in FIG. 1.

FIG. 7 is a block diagram of the management server 100. The management server 100 includes a Web UI 104, an operator notifying unit 105, an apparatus-screen drawing unit 106, an operator input/output managing unit 107, a notification determining unit 108, a state managing unit 109, an instruction creating unit 111, a communicating unit 112, and the storage unit 101.

The storage unit 101 is a storage medium such as an HDD, and stores therein screen element data, screen design data, setting data, and operation log data. The screen element data is data on screen elements of the operation screen 11G by each of the apparatuses 10 managed by the management server 100. The operation log data is data on an operation log of the apparatus 10 that transmits a notification the management server 100 by each of the apparatuses 10. The setting data is data on current settings for the apparatus 10 that transmits a notification to the management server 100 by each of the apparatuses 10. The screen design data is data on a screen design of the operation screen 11G by each model of the apparatuses 10.

The apparatus-screen drawing unit 106 draws an operation screen on the Web UI 104 by emulating that of the user's operation panel 11 (including the operation screen 11G and the hard key 11H) based on inputs to the notification determining unit 108, the state managing unit 109, and the operator input/output managing unit 107, and also the screen element data, the screen design data, the setting data, and the operation log data those stored in the storage unit 101.

The notification determining unit 108 determines a content of a notification transmitted from the apparatus 10, and issues an instruction to the apparatus 10 based on the content.

The communicating unit 112 communicates with the apparatus 10 to receive a notification from the apparatus 10 or transmit an instruction to the apparatus 10.

The instruction creating unit 111 creates an instruction to the apparatus 10 based on the screen element data, the screen design data, the setting data, and the operation log data upon an instruction from the operator input/output managing unit 107.

The state managing unit 109 emulates a state of the apparatus 10 based on information received from the apparatus-screen drawing unit 106 and the operator input/output managing unit 107.

The Web UI 104 is displayed on the operation panel 103 (103*a* to 103I). The Web UI 104 emulates and displays thereon the operation screen 11G, and is an interface for receiving an input from the operator.

The operator notifying unit 105 notifies the operator of a reception of a notification from the apparatus 10 (the user).

The operator input/output managing unit 107 requests the apparatus-screen drawing unit 106, the instruction creating unit 111, or the state managing unit 109 to perform a process depending on an input from the notification determining unit 108 or the state managing unit 109.

The management server 100 can reproduce and display a screen design of the operation screen 11G on the Web UI 104 based on the screen element data and the screen design data those stored in the storage unit 12 in the apparatus 10.

A mechanism of the apparatus management system 1 according to the first embodiment is explained in detail below. Upon receiving information on a screen design of the operation screen 11G (screen design data) and information relating to the apparatus 10 from the apparatus 10, the management server 100 rebuilds the screen design of the operation screen 11G based on the received information, and provides the rebuilt screen design to the apparatus 10.

Specifically, the apparatus 10 transmits screen design data and input information to the management server 100 via the Internet or via the interface device 14 and the Internet by using a simple object access protocol/hypertext transfer protocol security (SOAP/HTTPS) communication method of multi-message and polling, and then receives data from the management server 100.

The management server 100 selects required screen design data from the screen design data stored in the storage unit 101 by each of the apparatuses 10 based on the received input information and the screen design data, and automatically creates a screen design identical to that of the displayed operation screen 11G. A process of creating the screen design identical to that of the displayed operation screen 11G is explained in detail below with reference to FIG. 8.

In a state that the operation screen 11G is drawn on the operation panel 11 (step S11), when the user presses an "OPERATION-SCREEN OPERATING INQUIRY" key displayed on the operation screen 11G (step S12), the user input/output managing unit 20 receives a user's instruction indicating the "OPERATION-SCREEN OPERATING INQUIRY". Then, the user input/output managing unit 20 reads out screen design data on a current screen design of the operation screen 11G, setting data on current settings for the apparatus 10 (such as a model and an identification number of the apparatus 10, a copy quantity specification, and a sort specification), and operation log data on an operation log of last twenty operations performed by the user from the storage unit 12, and outputs the read data as an "OPERATION-SCREEN OPERATING INQUIRY CALL", i.e., a response to the "OPERATION-SCREEN OPERATING INQUIRY" to the notification creating unit 23. At this time, the state managing unit 22 determines a current state of the apparatus 10, and outputs the determined state to the notification creating unit 23.

Upon receiving the screen design data, the setting data, and the operation log data from the user input/output managing unit 20 and the state of the apparatus 10 from the state managing unit 22, the notification creating unit 23 creates a notification of the "OPERATION-SCREEN OPERATING INQUIRY CALL", and outputs the created notification to the communication managing unit 24.

Upon receiving the notification from the notification creating unit 23, the communication managing unit 24 transmits the received notification to the management server 100 (step S13).

The notification is received by the communicating unit 112 in the management server 100, and then the notification determining unit 108 determines a type of the notification.

If the type of the notification is determined as the "OPERATION-SCREEN OPERATING INQUIRY CALL", the operator notifying unit 105 displays a "CALL" on the operation screen of the Web UI 104.

When the operator recognizes the "CALL" displayed on the Web UI 104 (step S14), the operator input/output managing unit 107 acquires data on a model of the apparatus 10 from the screen element data, the setting data, and the screen design data those included in the received "OPERATION-SCREEN OPERATING INQUIRY CALL", and the apparatus-screen drawing unit 106 emulates the operation panel 11 including the currently-displayed operation screen 11G and the hard key 11H and a log of operations performed by the user, and displays the emulated operation panel 11 on the operation screen of the Web UI 104 based on a combination of the received information and the acquired data (step S15). The operator receives a confirmation from the user or provides an explanation to the user over the phone by watching the operation screen on the Web UI 104 (step S16).

Then, the user of the apparatus 10 operates the operation panel 11 in accordance with the operator's explanation (step S18), and a new screen design of the operation screen 11G is drawn on the operation panel 11 (steps S17 and S19). If the user further performs a predetermined operation (step S20), a new screen design of the operation screen 11G is redrawn on the operation panel 11 (step S21). At this time, a state of the operation screen 11G is changed such that a screen displayed on the operation screen 11G is changed to a different screen (step S22).

In this case, the user input/output managing unit 20 acquires an operation log from the operation log data stored in the storage unit 12, and outputs data on the acquired operation log to the notification creating unit 23. Upon receiving the data from the user input/output managing unit 20, the notification creating unit 23 creates a "NOTIFICATION OF THE OPERATION LOG", and outputs the created notification to the communication managing unit 24. Upon receiving the notification from the notification creating unit 23, the communication managing unit 24 transmits the received notification to the management server 100 (step S23).

The notification is received by the communicating unit 112 in the management server 100, and then the notification determining unit 108 determines a type of the notification.

When the type of the notification indicates the "NOTIFICATION OF THE OPERATION LOG", and when the operation log data is transmitted as a response to the "OPERATION-SCREEN OPERATING INQUIRY CALL" at step S23, the apparatus-screen drawing unit 106 transmits information on an operation of the currently-displayed operation screen of the Web UI 104 to the apparatus 10 via the operator input/output managing unit 107.

The apparatus-screen drawing unit 106 adds a log of the operation to the operation log data stored in the storage unit 101, and then draws the operation screen on the Web UI 104 based on the received information on the operation of the currently-displayed operation screen of the Web UI 104 (step S24). The operator receives a confirmation from the user over the phone by watching the operation screen of the Web UI 104 (step S25).

When the "OPERATION-SCREEN OPERATING INQUIRY" is terminated, the user of the apparatus 10 presses a "TERMINATION OF OPERATION-SCREEN OPERATING INQUIRY" key displayed on the operation screen 11G (step S26). Upon receiving an instruction for the "TERMINATION OF OPERATION-SCREEN OPERATING INQUIRY", the user input/output managing unit 20 acquires setting data on current settings for the apparatus 10 (such as a model and an identification number of the apparatus 10, a copy quantity specification, and a sort specification) and operation log data on an operation log of last twenty operations performed by the user from the storage unit 12, and outputs the acquired data as a response to the "TERMINATION OF OPERATION-SCREEN OPERATING INQUIRY" to the notification creating unit 23.

Upon receiving the acquired data from the user input/output managing unit 20, the notification creating unit 23 creates a notification indicating the "TERMINATION OF OPERATION-SCREEN OPERATING INQUIRY", and transmits the created notification to the communication managing unit 24. Upon receiving the notification from the notification creating unit 23, the communication managing unit 24 transmits the received notification to the management server 100 (step S27).

The notification is received by the communicating unit 112 in the management server 100, and then the notification determining unit 108 determines a type of the notification.

If the type of the notification indicates the "TERMINATION OF OPERATION-SCREEN OPERATING INQUIRY", the operator notifying unit 105 displays a "CALL CLOSED" on the operation screen of the Web UI 104 (step S28). When the operator recognizes the "CALL CLOSED" displayed on the Web UI 104, the operator's operation screen displayed on the Web UI 104 is closed.

As described above, the operator can explain about troubleshooting to the user, and therefore, the operator can promptly solve a trouble occurred in the apparatus 10 in the client sites KS.

Subsequently, a case where an operation of the operation screen of the Web UI 104 in the management server 100, which is performed by the operator, is reflected in the operation screen 11G of the apparatus 10 is explained below with reference to FIG. 9.

Figure 8A:
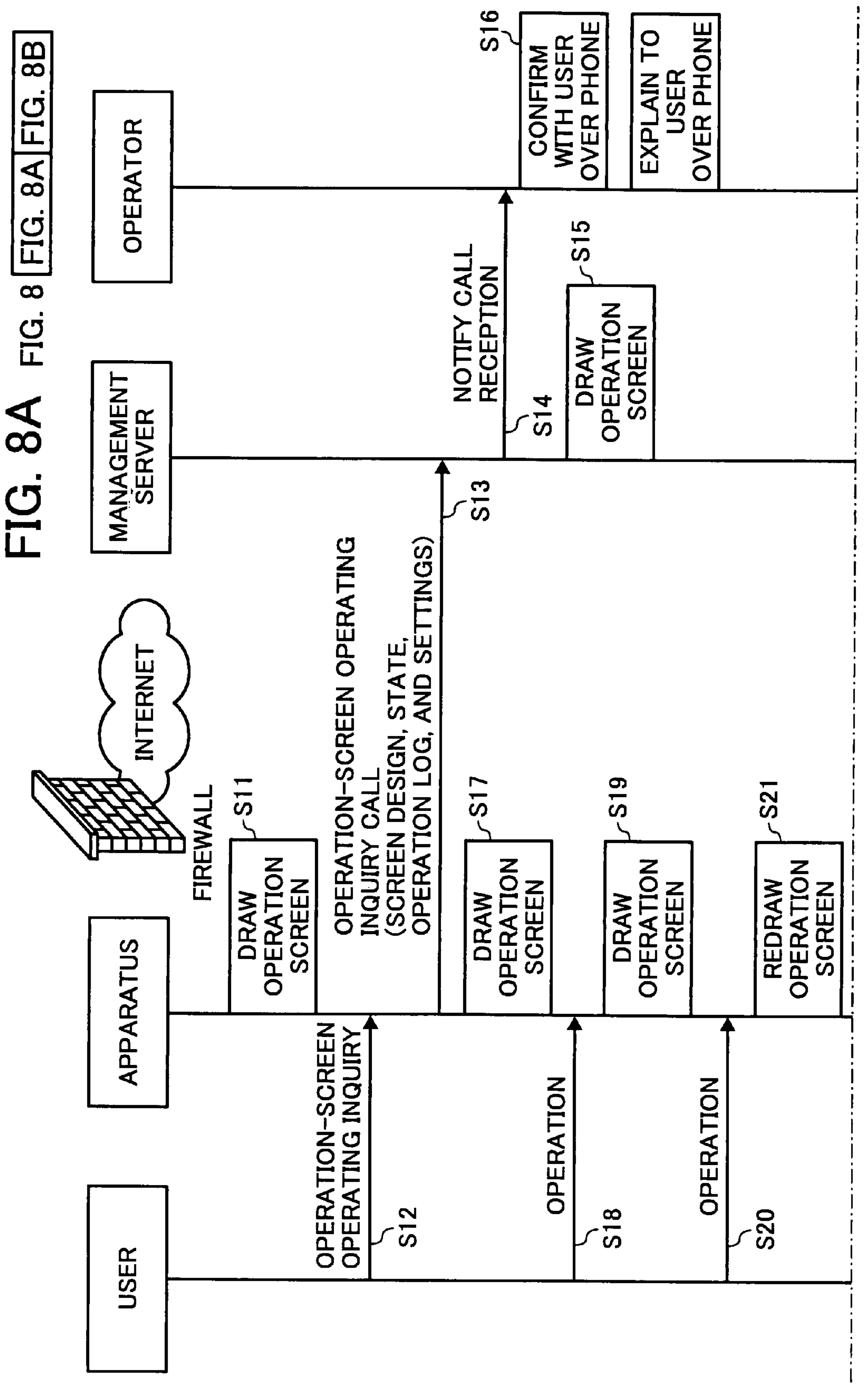
FIG. 8 is a sequence diagram for explaining how an operation screen of the apparatus is reflected in that of the management server in the apparatus management system shown in FIG. 1.
Figure 8B:
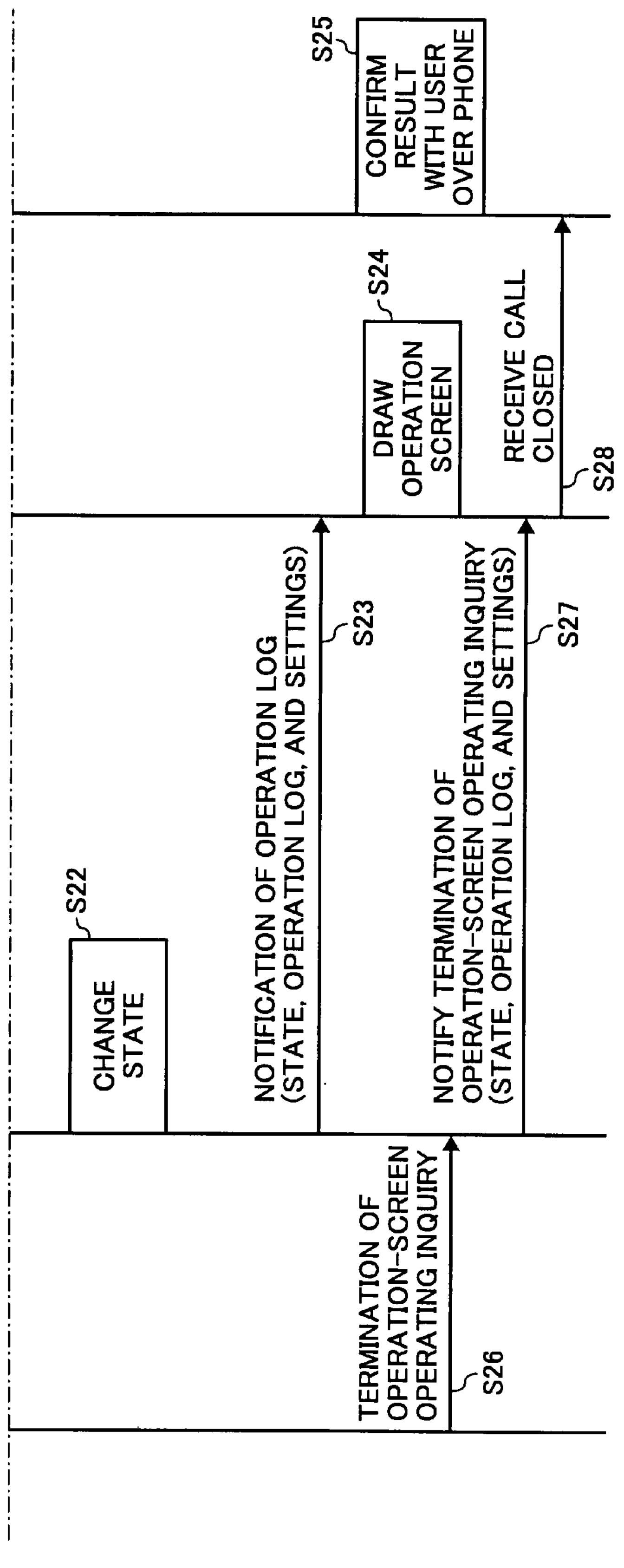

Procedures in steps S31 to S36 are identical to those in steps S12 to S17 in FIG. 8, and the description of those steps is omitted.

In the apparatus 10, the communication managing unit 24 transmits an "OPERATION-SCREEN OPERATING INQUIRY" to the management server 100 at predetermined intervals (polling) to check whether the operator performs any operation (step S37).

If the management server 100 receives an "OPERATION-SCREEN OPERATING INQUIRY CALL,", and also if a setting for "OPERATOR'S OPERATION PERMIT" is included in the setting data stored in the storage unit 101, the operator performs a few operations via the operation screen of the Web UI 104, and presses an "EXECUTION" key (step S38).

Then, the instruction creating unit 111 creates information on the operations performed the operator based on information on the operations performed by the operator via the operator input/output managing unit 107 and the order of the operations. When the communicating unit 112 receives an "OPERATOR'S OPERATION INQUIRY" from the apparatus 10, the communicating unit 112 transmits information on the operations performed the operator created by the instruction creating unit 111 to the apparatus 10 as a response to the "OPERATOR'S OPERATION INQUIRY" (step S39).

When the information on the operations performed the operator is received by the (communication managing unit 24 in the apparatus 10, the communication managing unit 24 outputs the information to the operator-instruction executing unit 21. The operator-instruction executing unit 21 analyzes the information, and executes the operations included in the information sequentially as the API of the user input/output managing unit 20. The user input/output managing unit 20 instructs the state managing unit 22 to operate the apparatus 10 to change the setting data (step S47) and also to update the operation log data. The user input/output managing unit 20 further instructs the screen drawing unit 17 to redraw a screen design of the operation screen 11G on the operation panel 11 (step S48). Procedures in steps S51 to S53 are identical to those in steps S26 to S28 in FIG. 8, and the description of those steps is omitted.

Figure 9A:
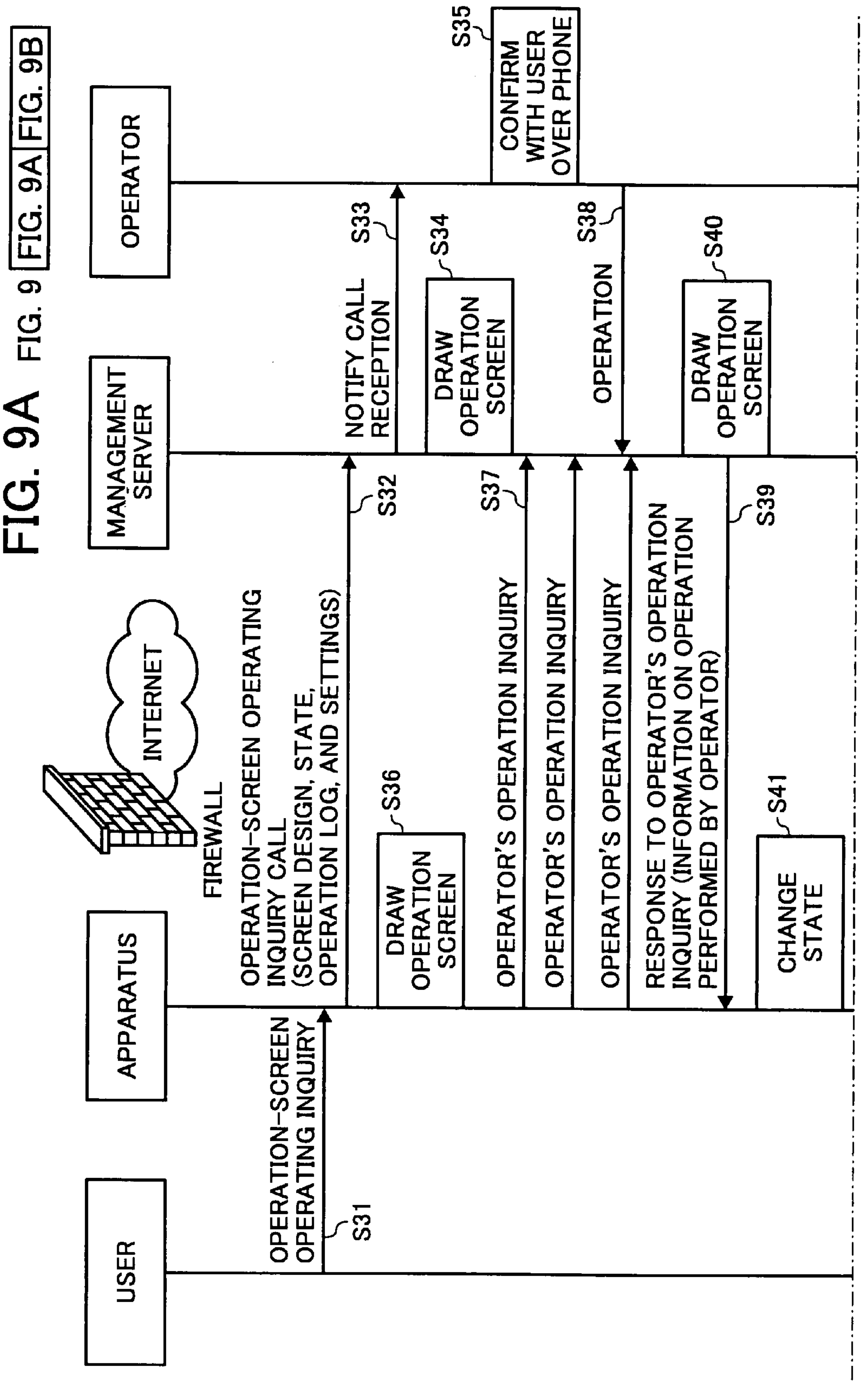
FIG. 9 is a sequence diagram for explaining how a screen design of an operation screen operated by the management server is reflected in that of the apparatus in the apparatus management system shown in FIG. 1.
Figure 9B:
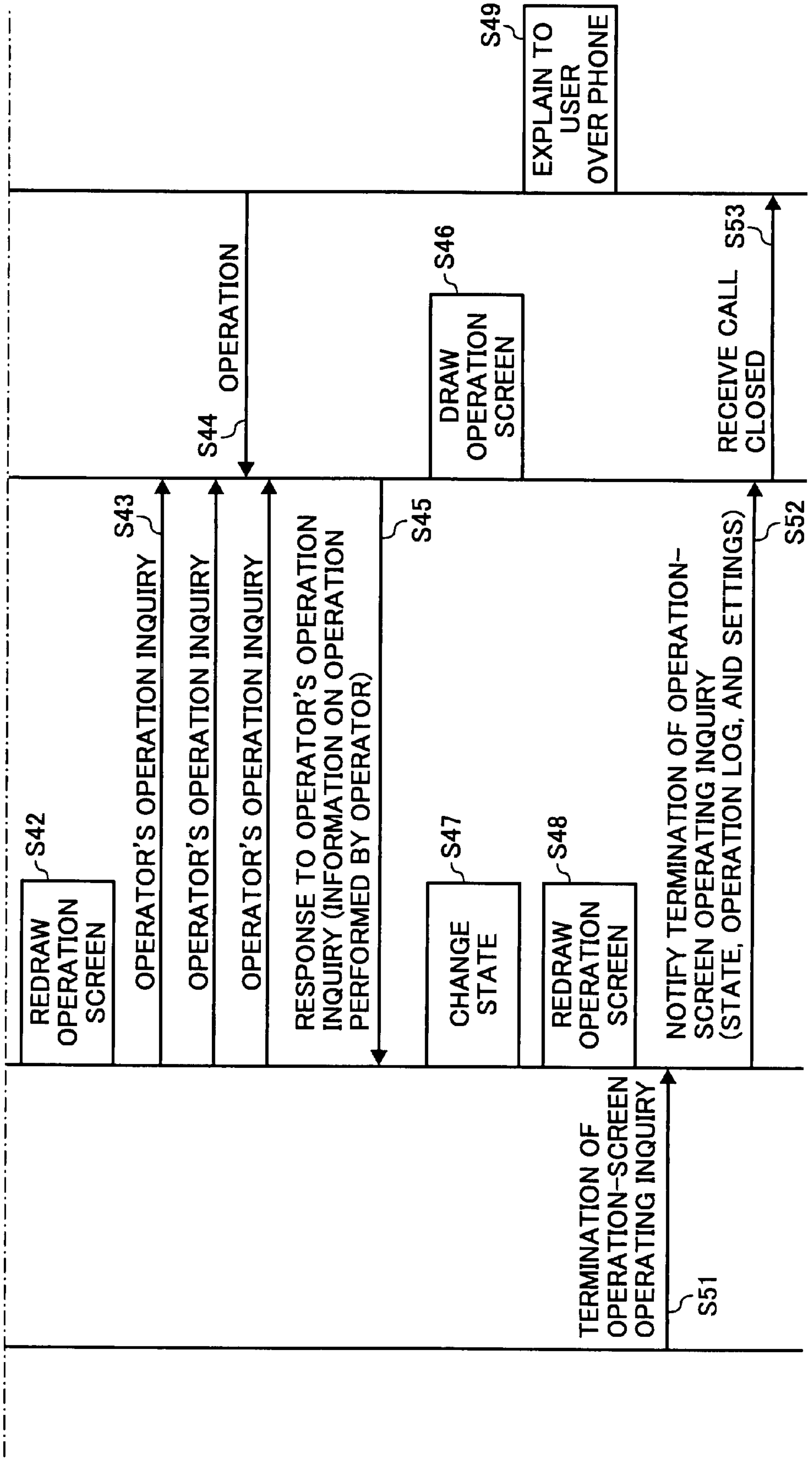

The user can switch between the processes shown in FIGS. 8 and 9, for example, in such a way that a pop-up window on which a user's operation transfer mode and an operator's operation transfer mode are displayed is provided on the operation panel 11 so that the user can select either the user's operation transfer mode or the operator's operation transfer mode via the pop-up window. If the user selects the user's operation transfer mode, the process shown in FIG. 8 is performed. If the user selects the operator's operation transfer mode, the process shown in FIG. 9 is performed.

Figure 10A:
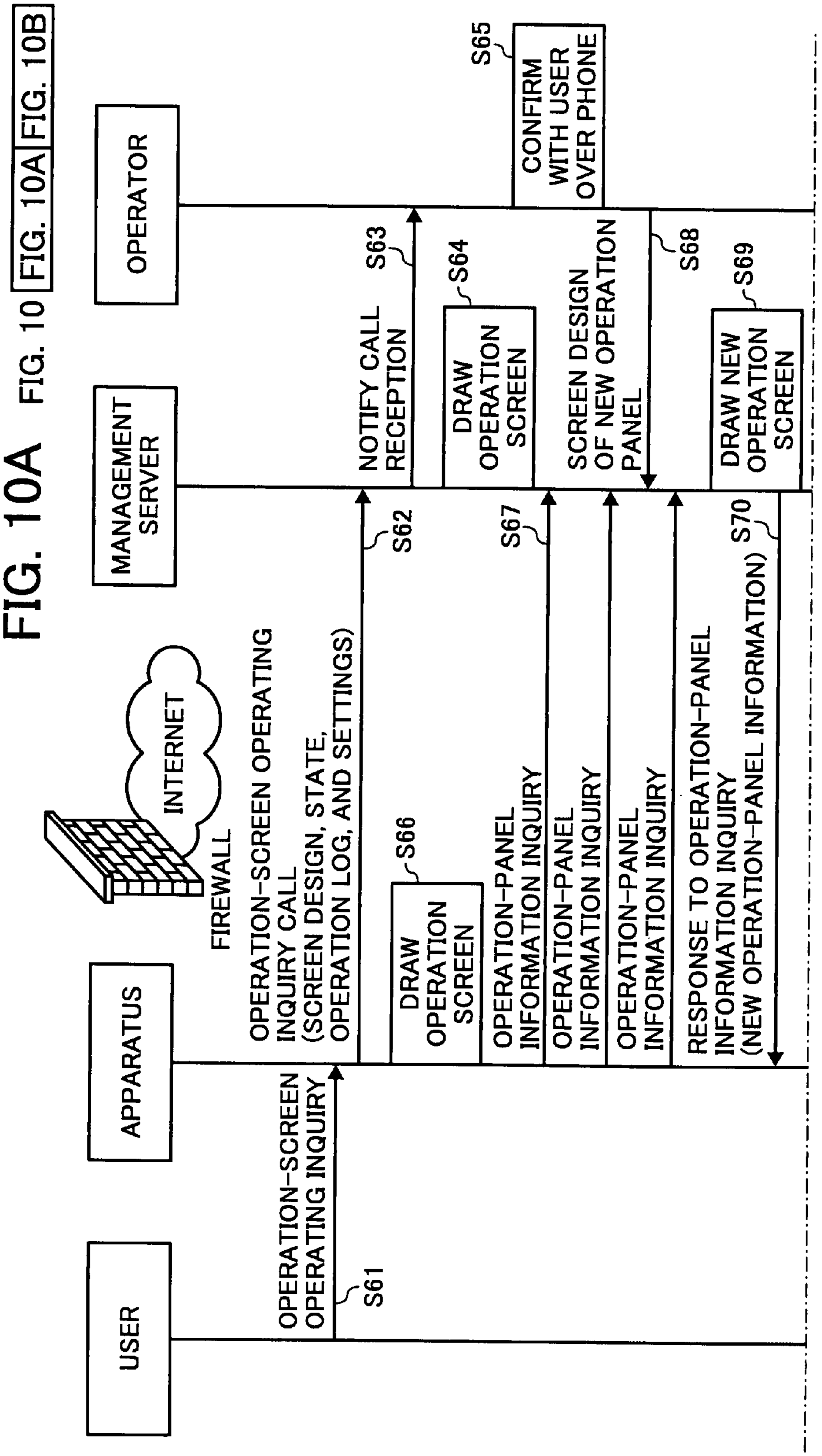
FIG. 10 is a sequence diagram for explaining how the management server transmits data on a screen design of the operation screen of the management server to the apparatus to change a screen design of the operation screen of the apparatus in the apparatus management system shown in FIG. 1.
Figure 10B:
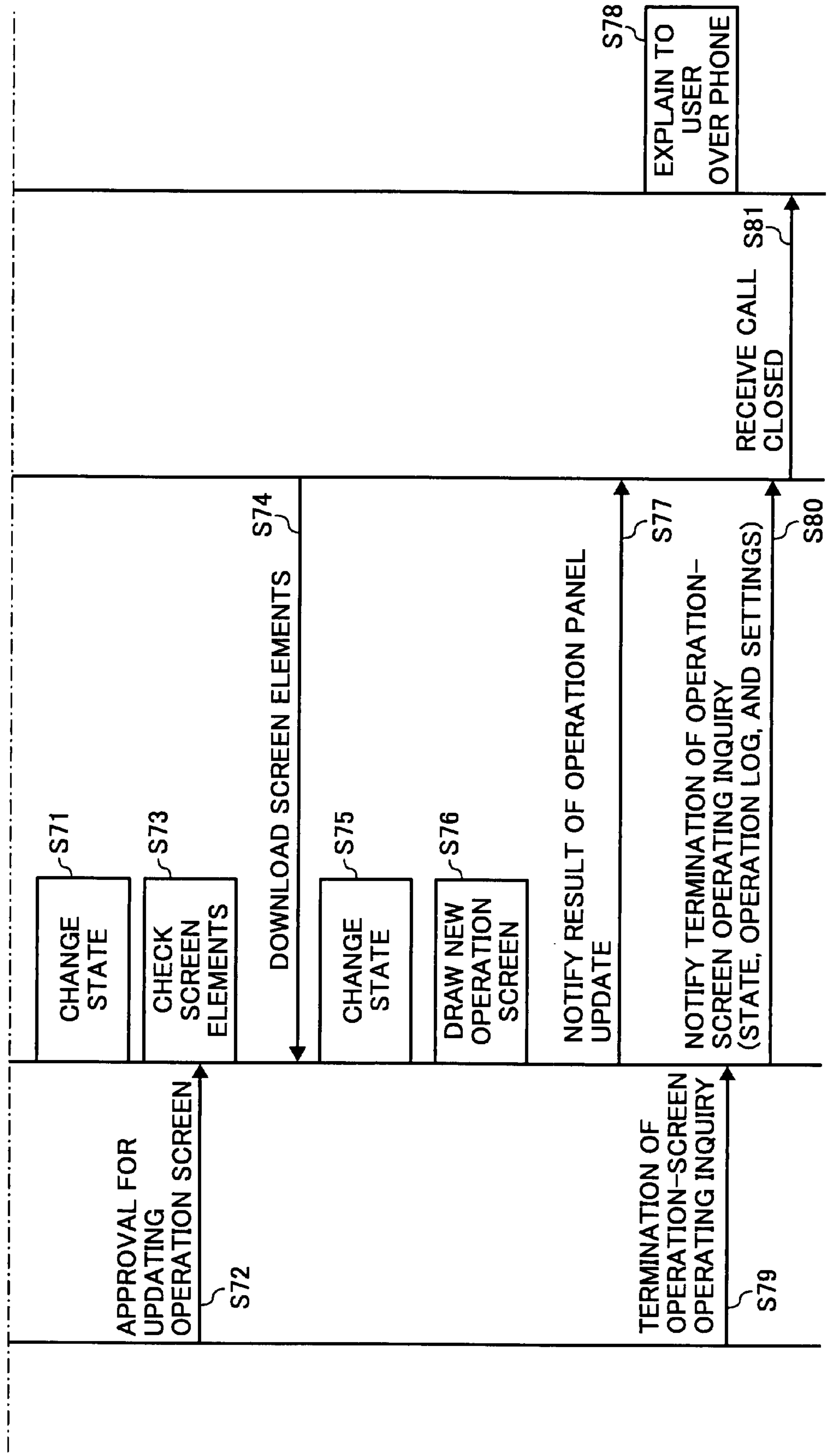

Subsequently, a process of updating the operation screen 11G, which is performed by the operator, is explained below with reference to FIG. 10.

Procedures in steps S61 to S66 are identical to those in steps S12 to S17 in FIG. 8, and the description of those steps is omitted.

In the apparatus 10, the communication managing unit 24 transmits an "OPERATION-PANEL INFORMATION INQUIRY" to the management server 100 at predetermined intervals (polling) to check whether the operator performs any operation (step S67).

If the management server 100 receives an "OPERATION-SCREEN OPERATING INQUIRY CALL", and also if a setting for the "OPERATOR'S OPERATION PERMIT" is included in the setting data stored in the storage unit 101, the operator selects a customizable operation screen of the Web UI 104, and then presses the "EXECUTION" key (step S68).

Then, the instruction creating unit 111 creates information on the new operation screen selected by the operator via the operator input/output managing unit 107 (such as data on a screen design of the new operation screen and an uniform resource locator (URL) for downloading screen elements of the new operation screen) as new display-panel information. When the communicating unit 112 receives the "OPERATION-PANEL INFORMATION INQUIRY" from the apparatus 10, if the new display-panel is created, the communicating unit 112 transmits the new display-panel information to the apparatus 10 as a response to the "OPERATION-PANEL INFORMATION INQUIRY" (step S70).

When the new display-panel information is received by the communication managing unit 24 in the apparatus 10, the communication managing unit 24 outputs the received new display-panel information to the operator-instruction executing unit 21. Then, the operator-instruction executing unit 21 analyzes the new display-panel information, and instructs the operation-screen updating unit 19 to update the screen design of the operation screen 11G. The operation-screen updating unit 19 confirms with the user to obtain approval for updating the operation screen 11G.

When the user gives approval for updating the operation screen 11G (step S72), the communication managing unit 24 checks whether screen element data included in the new operation-screen information is stored in the storage unit 12 (step S73). If the screen element data is not stored in the storage unit 12, the communication managing unit 24 downloads the screen element data from a site addressed to the URL included in the new operation-screen information (step S74).

Upon downloading the screen element data, the operation-screen updating unit 19 stores the downloaded screen element data in the storage unit 12, and updates the screen element data stored in the storage unit 12 with the downloaded screen element data, and then instructs the screen drawing unit 17 to redraw the operation screen 11G on the operation panel 11 (step S76). As a result, a new screen design of the operation screen 11G is displayed. Then, the operation-screen updating unit 19 outputs a result of updating the operation screen 11G to the notification creating unit 23. Upon receiving the result from the operation-screen updating unit 19, the notification creating unit 23 creates an update notification including the result, and then the communication managing unit 24 transmits the update notification to the management server 100 (step S77). Procedures in steps S79 to S81 are identical to those in steps S26 to S28 in FIG. 8, and the description of those steps is omitted.

In this manner, in the apparatus management system 1 according to the first embodiment, each of the apparatuses 10 provides data on a screen design of the operation screen 11G and screen elements included in the operation screen 11G to the management server 100 via the Internet or via the interface device 14 and the Internet, and the management server 100 rebuilds a screen design of the operation screen 11G based on the data received from the apparatus 10, and then provides data on the rebuilt screen design to the apparatus 10.

Therefore, a screen design of the operation screen 11G of the apparatus 10 can be changed easily and optimally. Thus, it is possible to provide a user-friendly screen design of the operation screen 11G.

Furthermore, in the apparatus management system 1 according to the first embodiment, the operation screen 11G of the operation panel 11 is composed of screen elements, and a layout of the screen elements and the API capable of realizing functions included in the apparatus 10 are computerized in associated manner, and thus a screen design of the operation screen 11G can be automatically created in real time. Moreover, by transmitting data on the screen elements and the layout of the screen elements, a state of the apparatus 10 and operational information to the management server 100, the management server 100 can rebuild the screen design of the operation screen 11G, which is automatically created in the apparatus 10, on the operation panel 103 in the operator terminal 102 in the same manner as the apparatus 10.

Therefore, the operator can properly and easily recognize a situation where the user of the apparatus 10 is in right now via the operation screen of the operation panel 103 which content is identical to that of the operation screen 11G.

Furthermore, in the apparatus management system 1 according to the first embodiment, the apparatus 10 or the interface device 14 communicates with the management server 100 at predetermined intervals by using a polling communication method, so that the apparatus 10 can acquire information on a screen design of the operation screen 11G that is rebuilt by the management server 100.

Therefore, a screen design of the operation screen 11G can be changed optimally depending on a usage state of the user of the apparatus 10. Thus, it is possible to provide a user-friendly screen design of the operation screen 11G.

Furthermore, in the apparatus management system 1 according to the first embodiment, the management server 100 transmits information on a rebuilt screen design of the operation screen 11G to the apparatus 10 or the apparatus 10 via the interface device 14 at a predetermined timing.

Therefore, the management center KC can change a screen design of the operation screen 11G in accordance with a user's inquiry, and transmit the screen design of the operation screen 11G, which is changed in a user-friendly manner, to the apparatus 10. Thus, it is possible to provide a user-friendly screen design of the operation screen 11G.

According to the first embodiment, when the user makes a phone call to the management center KC, the management center KC outputs screen design data and input information to the management server 100, and the management server 100 rebuilds a screen design of the operation screen 11G and transmits the rebuilt screen design of the operation screen 11G to the apparatus 10 so that the apparatus 10 can change the displayed screen design of the operation screen 11G to the user-friendly screen design of the operation screen 11G. The present invention is not limited to a case of the phone call from the user. Alternatively, the apparatus 10 can transmit input information on a user's operation input onto the operation screen 11G to the management server 100 so that the management server 100 can store therein the received input information. Then, the management server 100 analyzes a usage state of functions displayed on the operation screen 11G at predetermined intervals, and then rebuilds a screen design of the operation screen 11G based on the analyzed usage state.

Figure 11:
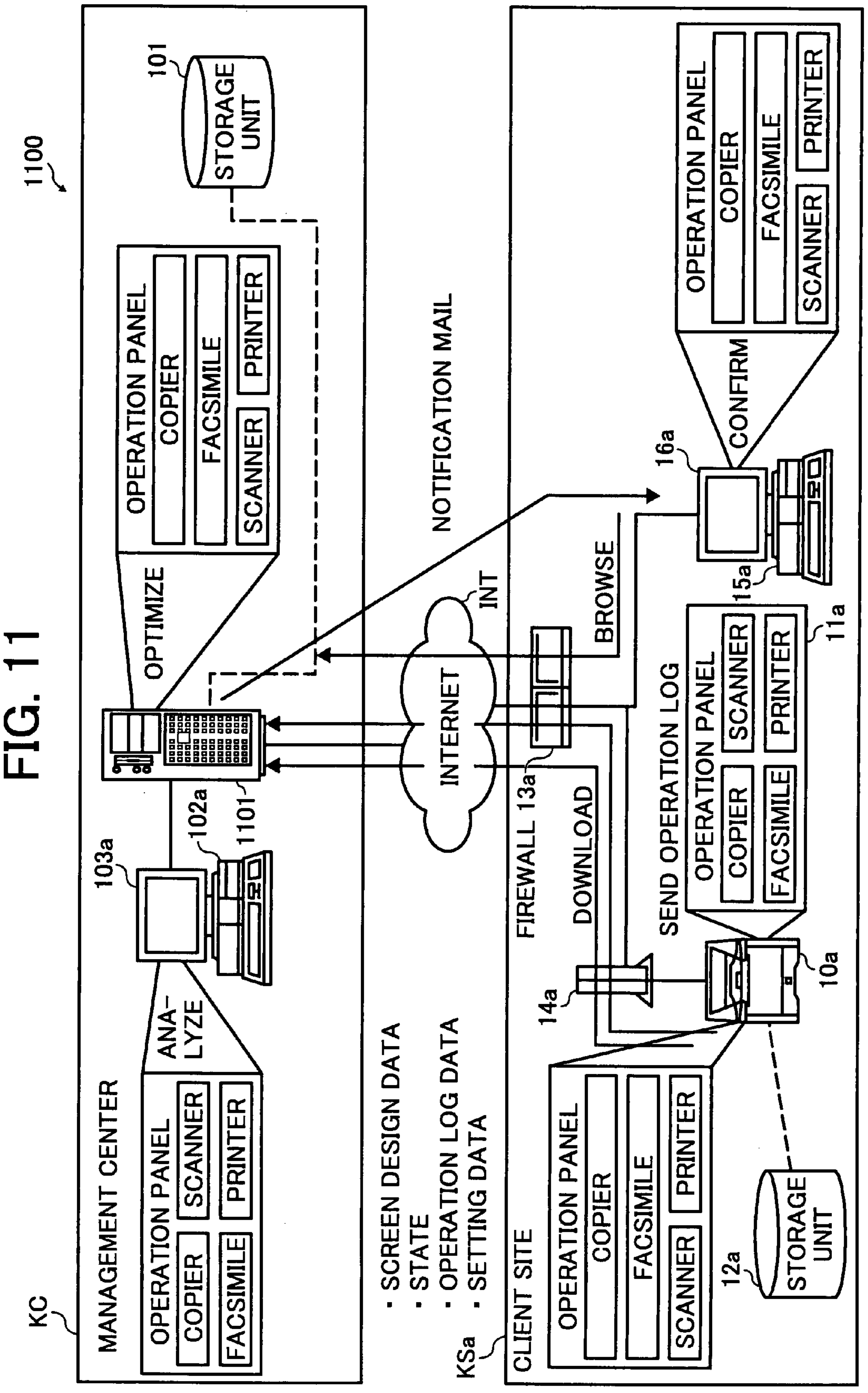
FIG. 11 is a system block diagram of an apparatus management system according to a second embodiment of the present invention.

An apparatus management system 1100 according to a second embodiment of the present invention is explained below with reference to FIG. 11. The portions identical to those in FIG. 1 for the first embodiment are denoted with the same reference numerals and the description of those portions is omitted.

In the apparatus management system 1100, the client site KSa further includes an information terminal 15*a*. The information terminal 15*a* is connected to the network where the apparatus 10*a* is connected. The information terminal 15*a* is, for example, a personal computer, and includes an operation panel 16*a* and an input unit such as a keyboard or a mouse. It is assumed that the operation screen 11Ga of the operation panel 11*a* of the apparatus 10*a* has a screen design as shown in FIG. 1, and the user operates the operation screen 11Ga to use the apparatus 10*a*.

The apparatus 10*a* transmits a usage state of the operation screen 11Ga of the operation panel 11*a*, such as the number of operations performed by the user (excluding the number of default settings), to the management server 100 at predetermined intervals, for example, every time the user inputs an operation input onto the operation screen 11Ga.

Figure 12:
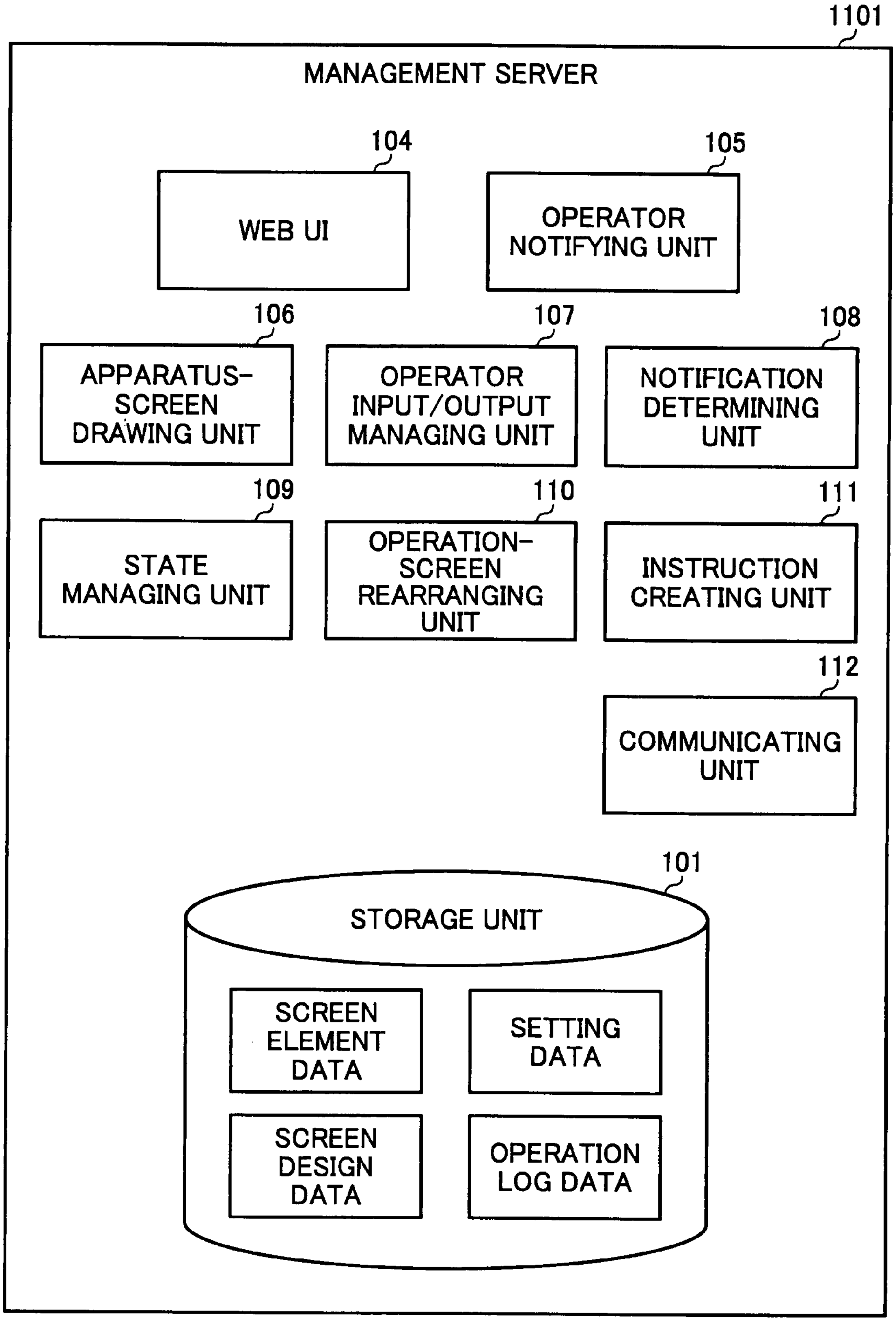
FIG. 12 is a block diagram of a management server included in the apparatus management system shown in FIG. 11.

FIG. 12 is a block diagram of a management server 1101 according to the second embodiment. The portions identical to those in the management server 100 shown in FIG. 7 are denoted with the same reference numerals, and the description of those portions is omitted. The difference between the management server 100 and the management server 1101 is that the management server 1101 further includes an operation-screen rearranging unit 110.

The operation-screen rearranging unit 110 analyzes a usage state of the operation screen 11G at predetermined intervals, and newly creates a screen design of the operation screen 11G such a way that a frequently-used function is magnified and displayed in the front side of the operation screen 11G, and then stores the newly-created screen design in the storages unit 101 as screen design data.

Figure 13A:
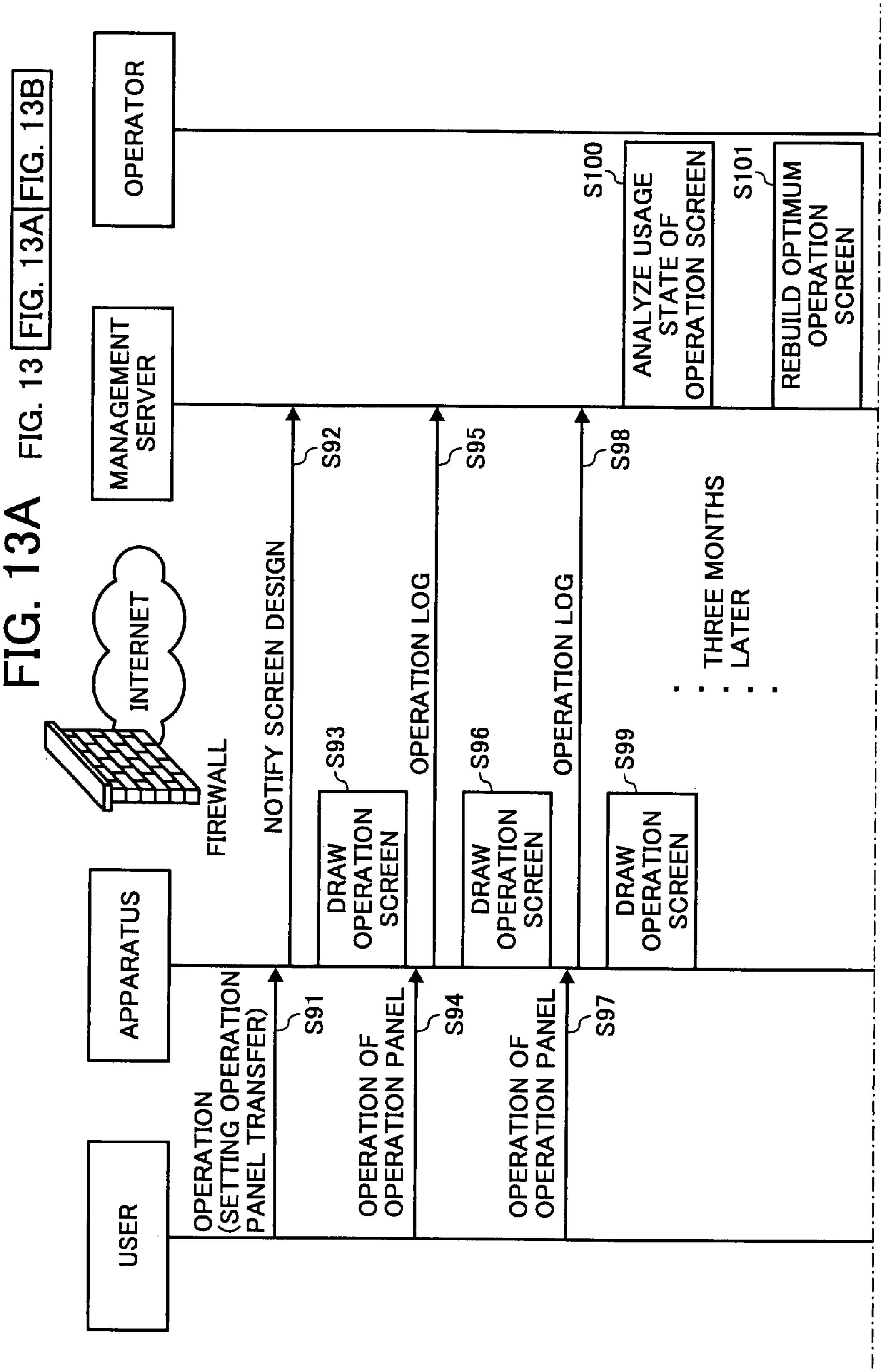
FIG. 13 is a sequence diagram for explaining how the management server rebuilds an operation screen based on an operation log of an operation panel of an apparatus included in the apparatus management system shown in FIG. 11.
Figure 13B:
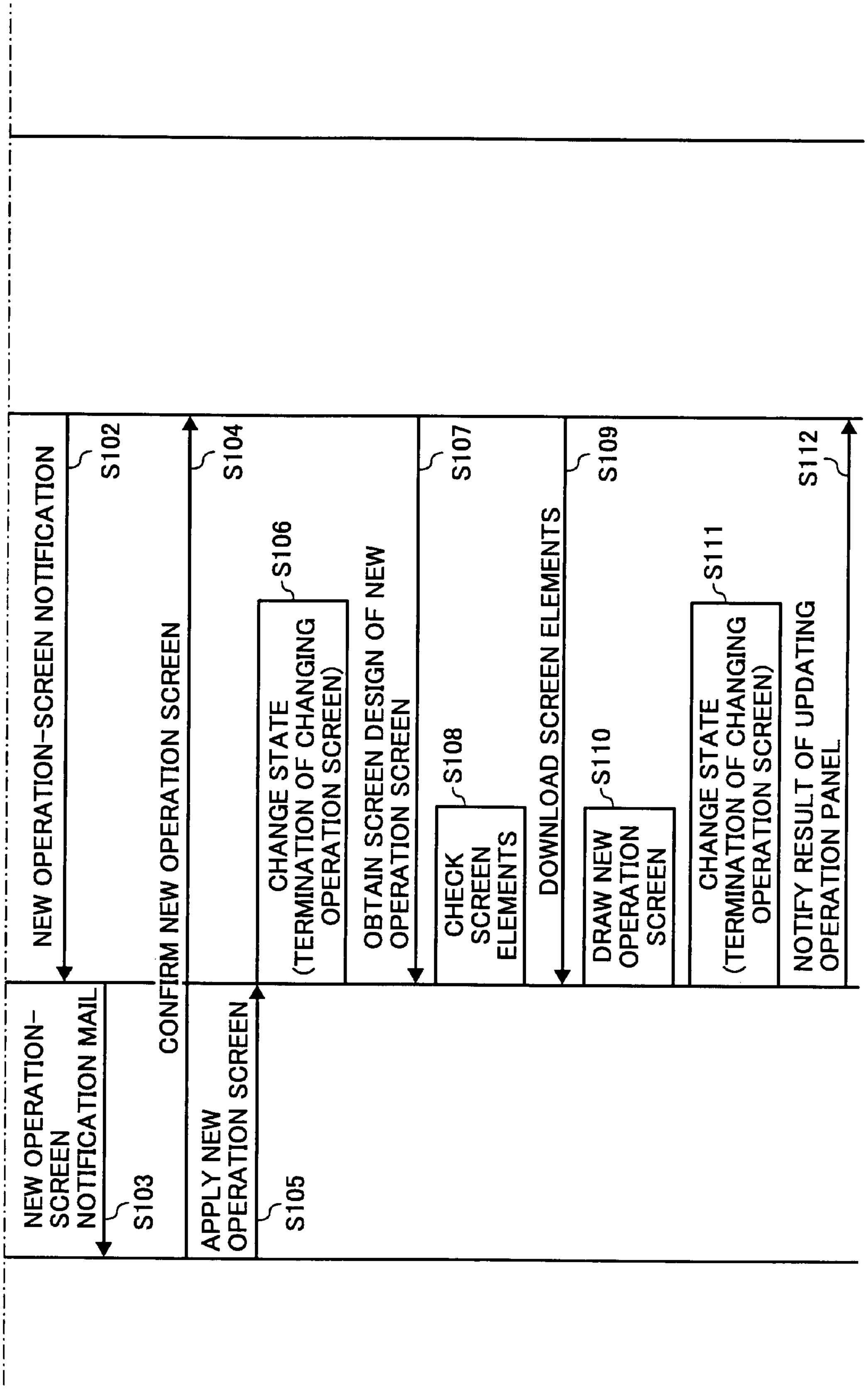

FIG. 13 is a sequence diagram for explaining a process of updating a screen design of the operation screen 11G with a newly-created screen design.

When the user inputs an operation input for setting an operation-screen transfer to the apparatus 10 (step S91), the apparatus 10 transmits screen design data to the management server 1101 (step 392) to cause the management server 1101 to draw the operation screen 11G on the operation panel 11 (step S93). When the user operates the operation panel 11 (step S94 or S97), the apparatus 10 transmits operation log data to the management server 1101 (step S95 or S98) to cause the management server 1101 to draw the operation screen 11G on the operation panel 11 (step S96 or S99).

Upon receiving the operation log data from the apparatus 10, the Web UI 104 in the management server 1101 outputs the received operation log data to the operation-screen rearranging unit 110. Upon receiving the operation log data from the Web UI 104, the operation-screen rearranging unit 110 stores the received operation log data in the storage unit 101.

The operation-screen rearranging unit 110 analyzes the stored operation log data by each model of the apparatuses 10 and also by each user, and determines a usage state of the operation screen 11G at predetermined intervals (for example, every three months) (step S100). Based on the usage state, the operation-screen rearranging unit 110 creates a plurality of screen design data (templates) in such a way that a frequently-used function or setting is rearranged in the front side of the operation screen 11G, conversely, a less frequently-used function or setting is rearranged in the rear side of the operation screen 11G so as to rebuild the operation screen 11G optimally (step S101).

The operation-screen rearranging unit 110 stores the created screen design data in the storage unit 101, and publishes the screen design data to a Web site, and then transmits a "NEW OPERATION-SCREEN NOTIFICATION" including a URL of the Web site to the apparatus 10 via the Web UI 104 (step S102).

When the communication managing unit 24 in the apparatus 10 receives the "NEW OPERATION-SCREEN NOTIFICATION" from the management server 1101, the operator-instruction executing unit 21 analyzes the "NEW OPERATION-SCREEN NOTIFICATION", and the mail sending unit 18 sends a mail with the "NEW OPERATION-SCREEN NOTIFICATION" to the user (step S103).

Upon receiving the mail, the user can recognize the new screen design of the operation screen 11G published on the Web site by clicking the URL included in the mail (step S104).

When the user selects the new screen design of the operation screen 11G (step S105), the screen design of the operation screen 11G can be changed to the selected new screen design (step S106), and the communication managing unit 24 receives screen design data on the new screen design of the operation screen 11G from the management server 1101 (step S107).

The communication managing unit 24 checks whether all screen elements included in the new screen design of the operation screen 11G are stored in the storage unit 12 based on the received screen design data that is analyzed by the operation-screen updating unit 19 (step S108). If all the screen elements are not stored in the storage unit 12, the communication managing unit 24 downloads data on necessary screen elements (step S109).

When the screen element data on the new screen design of the operation screen 11G is downloaded, the operation-screen updating unit 19 stores the downloaded screen element data in the storage unit 12, and updates the screen element data stored in the storage unit 12 with the downloaded screen element data, and then the new screen design of the operation screen 11G is drawn on the operation panel 11 (step S110). Then, the operation-screen updating unit 19 outputs a result of updating the screen design of the operation screen 11G to the notification creating unit 23. Upon receiving the result from the operation-screen updating unit 19, the notification creating unit 23 creates an "OPERATION-SCREEN UPDATE NOTIFICATION" including the result, and the communication managing unit 24 transmits the "OPERATION-SCREEN UPDATE NOTIFICATION" to the management server 1101 (step S111). In this manner, the screen design of the operation screen 11G can be rebuilt optimally.

For example, it is assumed that the table shown in FIG. 14 indicates statistics on operation log data transmitted from the apparatus 10*a*. As shown in FIG. 14, the user does not frequently use the "edit specification" and the "print density specification", on the contrary, the user frequently uses the "paper-size specification", the "zoom-ratio specification", and the "finishing specification". Therefore, in this case, the screen design of the operation screen 11G is to be rebuilt in such a way that the "edit specification" and the "print density specification" are shifted to a subscreen of the operation screen 11G, and then the "paper-size specification", the "zoom-ratio specification", and the "finishing specification" are magnified and displayed in the upper left side of a main screen of the operation screen 11G.

The apparatus 10*a* in the client site KSa is explained in the second embodiment, but the present invention can be applied to the other apparatuses 10*b* to 10*n* in the client sites KSb to KSn in the same manner as the apparatus 10*a* in the client site KSa.

In this manner, in the apparatus management system 1100 according to the second embodiment, each of the apparatuses 10 or each of the interface devices 14 provides information on the apparatus 10 including an operation log of the operation screen 11G to the management server 1101.

Therefore, the operator of the management server 1101 can recognize that which function is frequently-used or less frequently-used by the user, and provide an optimum screen design of the operation screen 11G based on the usage state, for example, in such a way that a frequently-used function is magnified and displayed in the upper-level operation screen, and a less frequently-used function is displayed in the lower-level operation screen. For example, an address book, a duplex/combine specification, and a position to be stapled are automatically sorted based on the usage state by the management server 1101 at predetermined intervals, so that the operation screen 11G can be optimally rebuilt depending on the usage state. Thus, it is possible to provide a user-friendly screen design of the operation screen 11G.

Furthermore, the management server 1101 can change a screen design of the operation screen 11G via a UI addressed to a URL by using screen design data and screen element data of the apparatuses 10 those stored in the storage unit 101 in the management server 1101, and store the changed screen design in the storage unit 101, and then reflect the changed screen design in the operation screen 11G.

Figure 15:
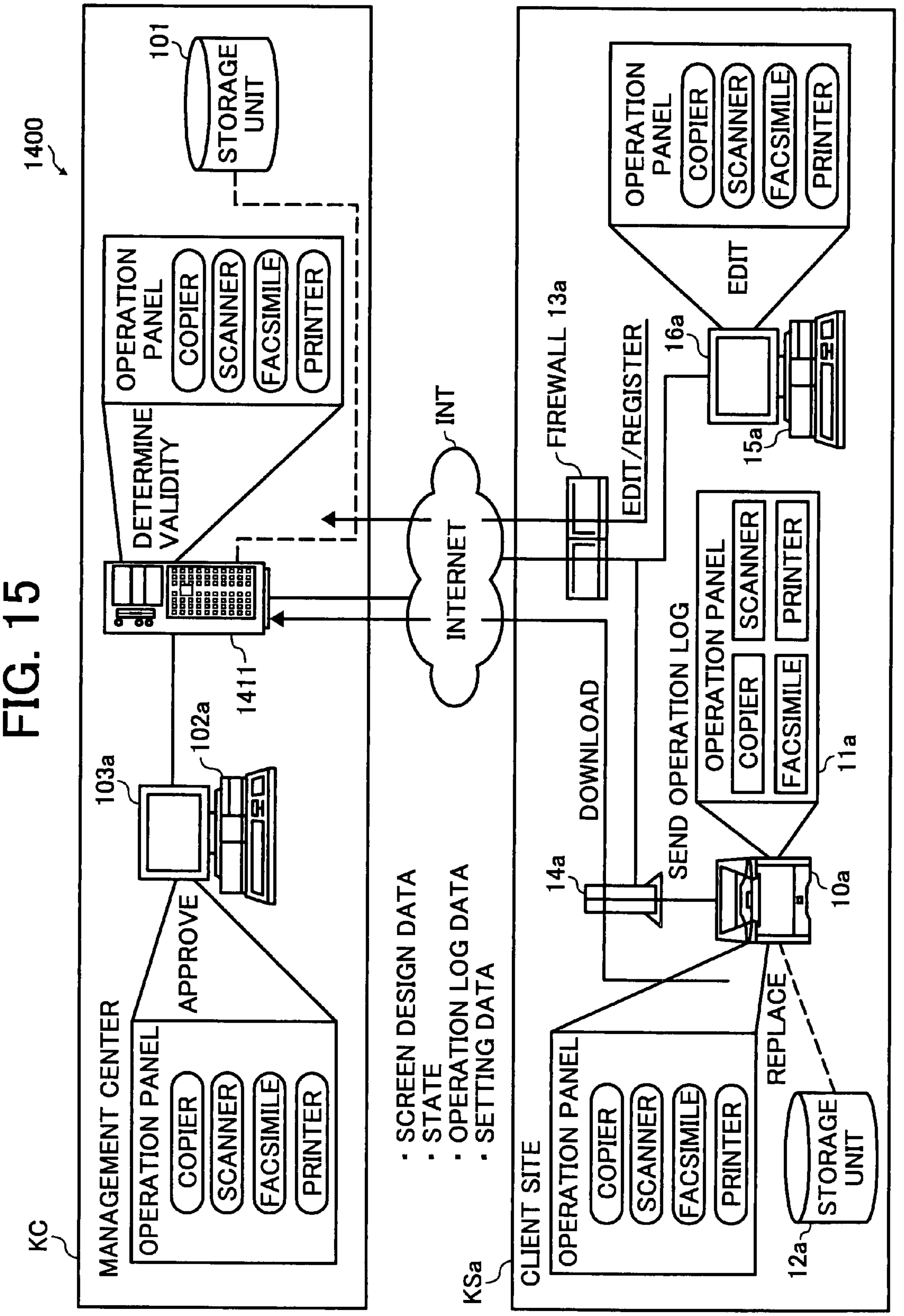
FIG. 15 is a system block diagram of an apparatus management system according to a variation of the present invention.

An apparatus management system 1400 according to a variation of the present invention is explained below with reference to FIG. 15. The portions identical to those in the apparatus management system 1 shown in FIG. 1 are denoted with the same reference numerals, and the description of those portions is omitted. In this case, the user of the apparatus 101 in the client site KSa can access a management server 1411, and edit a screen design of the operation screen 11Ga by using screen design data stored in the storage unit 101 in the management server 1411 via the Web UI 104 that displays thereon a Web site provided by the management server 1411.

When the user finishes editing the screen design of the operation screen 11Ga, the management server 1411 determines the validity of the edited screen design. If the determined validity exceeds a threshold, the management server 1411 displays the edited screen design of the operation screen 11Ga on the operation screen of the operation panel 103*a* in the operator terminal 102*a*. Then, if the operator accepts the edited screen design, the edited screen design is stored in the storage unit 101 in the management server 1411.

The apparatus 10*a* downloads the edited screen design from the management server 1411, and stores the downloaded screen design in the storage unit 12*a*, and then reflects the downloaded screen design in the operation screen 11Ga.

Therefore, the user can change a screen design of the operation screen 11G to a user-friendly screen design with easy and simple operations. Thus, it is possible to provide a user-friendly screen design of the operation screen 11G.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus management system comprising:

an apparatus configured to perform a process in response to an operation on an operation screen; and a management device that is connected to the apparatus via a network, and configured to manage the apparatus, wherein the apparatus includes a first displaying unit configured to display the operation screen and configured to receive an input from the operation screen, a first storage unit configured to store therein screen element data on screen elements that configure the operation screen, screen design data on the screen element data that configures the operation screen, setting data on settings for the apparatus, and log data on a log of an operation performed by a user on the operation screen, a first screen drawing unit configured to create the operation screen based on the screen element data and the screen design data, and configured to draw a created operation screen on the first displaying unit, and a first transmitting unit configured to transmit the screen design data and the setting data to the management device, the management device includes a second displaying unit configured to display thereon the operation screen, a second storage unit configured to store therein the screen element data that configures the operation screen for a plurality of apparatuses, a second receiving unit configured to receive the screen design data and the setting data from the apparatus, and a second screen drawing unit configured to create the operation screen from the screen element data based on the screen design data and the setting data received by the second receiving unit, and configured to draw a created operation screen on the second displaying unit, the first transmitting unit configured to transmit, when there is an operation input by the user on the operation screen, a new log data in which the operation input is recorded to the management device, the second receiving unit further receives the new log data from the apparatus, the second screen drawing unit configured to update the operation screen displayed on the second displaying unit based on the received new log data and the screen element data stored in the second storage unit, and configured to draw an updated operation screen on the second displaying unit, the second screen drawing unit drawing a same operation screen as a current operation screen displayed by the apparatus, the same operation screen drawn based on an operation screen information received from the apparatus, and the second screen drawing unit configured to receive a notification of operation log message along with the received new log data, update the display on the second display unit based on the received notification of operation log message and store the received new log data the log data and the new log data being a record of an operation history of the apparatus, wherein the first transmitting unit transmits an inquiry about an operational information of the management device to a second transmitting unit of the management device at predetermined intervals, upon receiving the inquiry, the second transmitting unit transmits the operational information to the apparatus, and the first screen drawing unit creates a new operation screen on the first displaying unit based on the transmitted operation information, and wherein the first displaying unit is further configured to switch between the operation screen created by the second screen drawing unit and the operation screen created by the first screen drawing unit in response to a user input.

2. The apparatus management system according to claim 1, wherein the management device further includes an input receiving unit configured to receive an operation input by an operator on the operation screen displayed on the second displaying unit; and the second transmitting unit configured to transmit operational information on the operation input received by the input receiving unit to the apparatus, and the apparatus further includes a screen updating unit configured to update the operation screen displayed on the first displaying unit based on the operational information received from the management device and the screen design data and the screen element data stored in the first storage unit.

3. The apparatus management system according to claim 2, wherein the management device further includes a creating unit configured to create operation-screen information including the screen design data on a new operation screen that is obtained by changing the operation screen based on the operation input received by the input receiving unit, the second transmitting unit transmits the operation-screen information created by the creating unit to the apparatus, and the screen updating unit updates the operation screen displayed on the first displaying unit based on the operation-screen information and the screen element data.

4. The apparatus management system according to claim 3, wherein the creating unit creates the operation-screen information that includes a storing location of the screen element data that configures the new operation screen, the second receiving unit receives a download request with the storing location specified from the apparatus, upon receiving the download request from the apparatus, the second transmitting unit downloads the screen element data to the apparatus that transmitted the download request, the first transmitting unit transmits the download request to the management device, the apparatus further includes a first receiving unit configured to receive the screen element data stored in the specified location as a response to the download request from the management device, and the screen updating unit extracts the screen design data on the new operation screen from the operation-screen information, and updates the operation screen displayed on the first displaying unit based on extracted screen design data and the screen element data.

5. The apparatus management system according to claim 4, wherein the first transmitting unit determines whether the screen element data is stored in the first storage unit based on the screen design data received from the management device, and if the screen element data is not stored in the first storage unit, transmits the download request to the management device.

6. The apparatus management system according to claim 3, wherein the first transmitting unit transmits an inquiry about the operation-screen information to the management device at predetermined intervals, and upon receiving the inquiry, if there is the operation-screen information, the second transmitting unit transmits the operation-screen information to the apparatus.

7. The apparatus management system according to claim 1, wherein the second storage unit accumulates the log data received from the apparatus, the management device further includes a rearranging unit configured to analyze a usage state of the screen element data stored in the second storage unit based on the log data accumulated in the second storage unit at predetermined intervals, and to create screen design data on the operation screen in which screen elements are rearranged based on the usage state, the second transmitting unit transmits the screen design data created by the rearranging unit to the apparatus, and the apparatus further includes a screen updating unit configured to update the operation screen displayed on the first displaying unit based on the screen design data received from the management device and the screen element data.

8. The apparatus management system according to claim 7, wherein the management device further includes a notifying unit configured to transmit a notification indicating that the screen design data on the operation screen in which the screen elements are rearranged is created to the apparatus, the second receiving unit receives a download request with a storing location of the screen element data and the screen design data specified from the apparatus, the first transmitting unit transmits the download request to the management device, and the second transmitting unit transmits the screen design data created by the rearranging unit and the screen element data to the apparatus as a response to the download request.

9. The apparatus management system of claim 1, wherein the management device creates information based on operations performed by an operator of the management device and an order of the performed operations.

10. The apparatus management system of claim 1, wherein when information on operations performed by an operator of the management device is received by the apparatus, the apparatus analyzes the received information and sequentially executes the operations included in the received information.

11. The apparatus management system according to claim 1, wherein the second screen drawing unit obtains the log data from the received notification of operation log message.

12. A method of managing an apparatus in an apparatus management system that includes an apparatus configured to perform a process in response to an operation on an operation screen and a management device that is connected to the apparatus via a network and configured to manage the apparatus, the method comprising:

storing including the management device storing screen element data that configures the operation screen for a plurality of apparatuses;

receiving screen design data on the screen element data that configures the operation screen and setting data on settings for the apparatus;

drawing including creating the operation screen from the screen element data based on the screen design data and the setting data received at the receiving, and drawing created operating screen on a displaying unit, wherein the receiving includes receiving a new log data on an operation performed by a user on the operation screen from the apparatus, the drawing includes updating the operation screen based on the received new log data received at the receiving and the screen element data stored at the storing, the drawing further including drawing a same operation screen as a current operation screen displayed by the apparatus, the same operation screen drawn based on an operation screen information received from the apparatus, and the receiving further includes receiving a notification of operation log message along with the received new log data, updating the display on the operation screen based on the received notification of operation log message and the received new log data and stored the received new log data the log data and the new log data being a record of an operation history of the apparatus, receiving an operation input by an operator on the operation screen about an operational information of the management device at predetermined intervals;

transmitting the operation information to the apparatus; and switching a display of the apparatus between the operation screen created from the screen element data during the drawing and an operation screen created by the log data received.

13. The method according to claim 12, further comprising:

creating operation-screen information including the screen design data on a new operation screen that is obtained by changing the operation screen based on the operation input; and transmitting the operation-screen information to the apparatus.

14. The method according to claim 12, wherein the storing includes accumulating the log data received from the apparatus, and the method further including, rearranging including analyzing a usage state of the screen element data based on accumulated log data, and creating screen design data on the operation screen in which screen elements are rearranged based on the usage state;

and transmitting the screen design data created at the second creating to the rearranging.

15. The method according to claim 12, wherein the receiving further includes receiving the log data from the received notification of operation log message.

16. An apparatus management system comprising:

an apparatus configured to perform a process in response to an operation on an operation screen; and a management device that is connected to the apparatus via a network, and configured to manage the apparatus, wherein the apparatus includes a first displaying means for displaying the operation screen and receiving an input from the operation screen, a first storing means for storing therein screen element data on screen elements that configure the operation screen, screen design data on the screen element data that configures the operation screen, setting data on settings for the apparatus, and log data on an operation performed by a user on the operation screen, a first screen drawing means for creating the operation screen based on the screen element data and the screen design data, and drawing a created operation screen on the first displaying means, and a first transmitting means for transmitting the screen design data and the setting data to the management device, the management device includes a second displaying means for displaying thereon the operation screen, a second storing means for storing therein the screen element data that configures the operation screen for a plurality of apparatuses, a second receiving means for receiving the screen design data and the setting data from the apparatus, and a second screen drawing means for creating the operation screen from the screen element data based on the screen design data and the setting data received by the second receiving means, and drawing a created operation screen on the second displaying means, the first transmitting means includes a transmitting means for transmitting, when there is an operation input by the user on the operation screen, a new log data in which the operation input is recorded to the management device, the second receiving means includes a receiving means for receiving the new log data from the apparatus, the second screen drawing means includes an updating means for updating the operation screen displayed on the second displaying means based on received new log data and the screen element data stored in the second storing means, and draws an updated operation screen on the second displaying means, the second screen drawing means drawing a same operation screen as a current operation screen displayed by the apparatus, the same operation screen drawn based on an operation screen information received from the apparatus, and the second screen drawing means receives a notification of operation log message along with the received new log data from the receiving means, and the updating means updates the display on the second displaying means based on the received notification of operation log message and the updating means stored the received new log data in the second storing means the log data and the new log data being a record of an operation history of the apparatus, wherein the first transmitting means transmits an inquiry about an operational information of the management device to a second transmitting means of the management device at predetermined intervals, upon receiving the inquiry, the second transmitting means transmits the operational information to the apparatus, and the first screen drawing means creates a new operation screen on the first displaying means based on the transmitted operation information, and wherein the first displaying means is further configured to switch between the operation screen created by the second screen drawing means and the operation screen created by the first screen drawing means in response to a user input.

17. The apparatus management system according to claim 16, wherein the second screen drawing means receives the log data from the notification of operation log message received from the receiving means.

* * * * *